(12) United States Patent
Kelliher et al.

(10) Patent No.: US 9,347,020 B2
(45) Date of Patent: May 24, 2016

(54) HEATED CHROMATOGRAPHIC SEPARATION PROCESS

(75) Inventors: Adam Kelliher, Greater London (GB); Angus Morrison, Greater London (GB); Anil Oroskar, Lombard, IL (US); Rakesh Vikraman Nair Rema, Lombard, IL (US); Abhilesh Agarwal, Lombard, IL (US)

(73) Assignee: BASF Pharma Callanish Limited, Cheadle, Cheshire (GB)

( * ) Notice: Subject to any disclaimer, the term of this patent is extended or adjusted under 35 U.S.C. 154(b) by 0 days.

(21) Appl. No.: 13/880,148

(22) PCT Filed: Jul. 6, 2012

(86) PCT No.: PCT/GB2012/051592
§ 371 (c)(1),
(2), (4) Date: Jul. 22, 2013

(87) PCT Pub. No.: WO2013/005047
PCT Pub. Date: Jan. 10, 2013

(65) Prior Publication Data
US 2014/0107359 A1   Apr. 17, 2014

(30) Foreign Application Priority Data

Jul. 6, 2011   (GB) .................................. 1111594.6

(51) Int. Cl.
*C11B 3/10*       (2006.01)
*C11B 3/00*       (2006.01)
(Continued)

(52) U.S. Cl.
CPC .............. *C11B 3/006* (2013.01); *B01D 15/185* (2013.01); *B01D 15/1892* (2013.01); *B01D 15/3876* (2013.01); *C11B 3/10* (2013.01); *C11C 1/08* (2013.01)

(58) Field of Classification Search
CPC ........ C11C 1/007; C11C 1/02; B01D 15/1892
USPC .................................................. 554/191, 193
See application file for complete search history.

(56) References Cited

U.S. PATENT DOCUMENTS

| 2,985,589 A | 5/1961 | Broughton et al. |
| 3,696,107 A | 10/1972 | Neuzil |

(Continued)

FOREIGN PATENT DOCUMENTS

| DK | 1338316 | 3/2005 |
| DK | 1128881 | 10/2005 |

(Continued)

OTHER PUBLICATIONS

Szepesy, et al., "Journal of Chromatography", vol. 108, No. 2, 1975, pp. 285-297.

(Continued)

*Primary Examiner* — Deborah D Carr
(74) *Attorney, Agent, or Firm* — Knobbe, Martens, Olson & Bear, LLP

(57) ABSTRACT

The present invention provides a chromatographic separation process for recovering a polyunsaturated fatty acid (PUFA) product from a feed mixture, which process comprises passing the feed mixture through one or more chromatographic columns containing, as eluent, an aqueous organic solvent, wherein the temperature of at least one of the chromatographic columns through which the feed mixture is passed is greater than room temperature.

20 Claims, 13 Drawing Sheets

(51) Int. Cl.
　　B01D 15/18　　(2006.01)
　　B01D 15/38　　(2006.01)
　　C11C 1/08　　(2006.01)

(56) References Cited

U.S. PATENT DOCUMENTS

| | | | |
|---|---|---|---|
| 3,706,812 A | 12/1972 | Derosset et al. | |
| 3,761,533 A | 9/1973 | Otani et al. | |
| 4,036,745 A | 7/1977 | Broughton | |
| 4,048,111 A | 9/1977 | Rosback et al. | |
| 4,048,205 A | 9/1977 | Neuzil et al. | |
| 4,049,688 A | 9/1977 | Neuzil et al. | |
| 4,313,015 A | 1/1982 | Broughton | |
| 4,329,280 A | 5/1982 | Cleary et al. | |
| 4,353,838 A | 10/1982 | Cleary et al. | |
| 4,353,839 A | 10/1982 | Cleary et al. | |
| 4,404,145 A | 9/1983 | Cleary et al. | |
| 4,433,195 A | 2/1984 | Kulprathipanja | |
| 4,486,618 A | 12/1984 | Kulprathipanja et al. | |
| 4,495,106 A | 1/1985 | Cleary et al. | |
| 4,511,514 A | 4/1985 | Cleary et al. | |
| 4,519,952 A | 5/1985 | Cleary et al. | |
| 4,521,343 A | 6/1985 | Chao et al. | |
| 4,522,761 A | 6/1985 | Cleary et al. | |
| 4,524,029 A | 6/1985 | Cleary et al. | |
| 4,524,030 A | 6/1985 | Cleary et al. | |
| 4,529,551 A | 7/1985 | Cleary et al. | |
| 4,560,675 A | 12/1985 | Cleary et al. | |
| 4,605,783 A | 8/1986 | Zinnen | |
| 4,720,579 A | 1/1988 | Kulprathipanja | |
| 4,764,276 A | 8/1988 | Berry et al. | |
| 4,882,065 A | 11/1989 | Barder | |
| 4,902,829 A | 2/1990 | Kulprathipanja et al. | |
| 4,961,881 A | 10/1990 | Ou | |
| 5,068,418 A | 11/1991 | Kulprathipanja et al. | |
| 5,068,419 A | 11/1991 | Kulprathipanja et al. | |
| 5,069,883 A | 12/1991 | Matonte | |
| 5,093,004 A | 3/1992 | Hotier | |
| 5,114,590 A | 5/1992 | Hotier et al. | |
| 5,179,219 A | 1/1993 | Priegnitz | |
| 5,225,580 A | 7/1993 | Zinnen | |
| 5,405,534 A | 4/1995 | Ishida et al. | |
| 5,422,007 A | 6/1995 | Nicoud et al. | |
| 5,502,077 A | 3/1996 | Breivik et al. | |
| 5,547,580 A | 8/1996 | Tsujii et al. | |
| 5,656,667 A | 8/1997 | Breivik et al. | |
| 5,698,594 A | 12/1997 | Breivik et al. | |
| 5,719,302 A * | 2/1998 | Perrut et al. | 554/191 |
| 5,777,141 A | 7/1998 | Brunner et al. | |
| 5,840,181 A | 11/1998 | Patton et al. | |
| 5,917,068 A | 6/1999 | Barnicki et al. | |
| 5,945,318 A | 8/1999 | Breivik et al. | |
| 6,013,186 A | 1/2000 | Patton et al. | |
| 6,096,218 A | 8/2000 | Hauck | |
| 6,136,198 A | 10/2000 | Adam et al. | |
| 6,204,401 B1 | 3/2001 | Perrut et al. | |
| 6,313,330 B1 | 11/2001 | Kiyohara et al. | |
| 6,325,898 B1 | 12/2001 | Blehaut et al. | |
| 6,350,890 B1 | 2/2002 | Kiy et al. | |
| 6,409,923 B1 | 6/2002 | Nicoud et al. | |
| 6,413,419 B1 | 7/2002 | Adam et al. | |
| 6,471,870 B1 | 10/2002 | Nicoud | |
| 6,518,049 B1 | 2/2003 | Haraldsson et al. | |
| 6,544,413 B1 | 4/2003 | Nagamatsu et al. | |
| 6,713,447 B2 | 3/2004 | Beaudoin et al. | |
| 6,863,824 B2 | 3/2005 | Hamende et al. | |
| 6,979,402 B1 | 12/2005 | Sprague et al. | |
| 7,491,522 B2 | 2/2009 | Haraldsson et al. | |
| 7,588,791 B2 | 9/2009 | Fabritius | |
| 7,678,930 B2 | 3/2010 | Sondbo et al. | |
| 7,709,236 B2 | 5/2010 | Akimoto et al. | |
| 7,718,698 B2 | 5/2010 | Breivik et al. | |
| 7,732,488 B2 | 6/2010 | Breivik et al. | |
| 7,807,848 B2 | 10/2010 | Wang | |
| 2002/0011445 A1 | 1/2002 | Lehoucq et al. | |
| 2002/0068833 A1 | 6/2002 | Chanteloup et al. | |
| 2003/0222024 A1 | 12/2003 | Hamende et al. | |
| 2004/0099604 A1 | 5/2004 | Hauck | |
| 2004/0174769 A1 | 9/2004 | Weetman | |
| 2005/0087494 A1 | 4/2005 | Hauck et al. | |
| 2006/0008667 A1 | 1/2006 | Kim et al. | |
| 2006/0124549 A1 | 6/2006 | Bailly et al. | |
| 2007/0158270 A1 | 7/2007 | Geier et al. | |
| 2007/0181504 A1 | 8/2007 | Binder et al. | |
| 2009/0176284 A1 | 7/2009 | Furihata et al. | |
| 2010/0012584 A1 | 1/2010 | Majewski et al. | |
| 2010/0104657 A1 | 4/2010 | Sondbo et al. | |
| 2010/0163490 A1 | 7/2010 | Lasalle | |
| 2010/0186587 A1 | 7/2010 | Kessler et al. | |
| 2010/0190220 A1 | 7/2010 | Furihata et al. | |
| 2010/0233281 A1 | 9/2010 | Breivik et al. | |
| 2010/0267829 A1 | 10/2010 | Breivik et al. | |
| 2010/0331561 A1 | 12/2010 | Schaap et al. | |
| 2011/0000853 A1 | 1/2011 | Valery et al. | |
| 2011/0015418 A1 | 1/2011 | Krumbholz et al. | |
| 2011/0030457 A1 | 2/2011 | Valery et al. | |
| 2011/0091947 A1 | 4/2011 | Kim et al. | |
| 2012/0214966 A1 | 8/2012 | Theoleyre et al. | |

FOREIGN PATENT DOCUMENTS

| | | | |
|---|---|---|---|
| EP | 0255824 | 7/1987 | |
| EP | 0697034 | 11/1994 | |
| EP | 0981399 | 11/1998 | |
| EP | 1152755 | 8/2000 | |
| EP | 1106602 | 6/2001 | |
| EP | 1250058 | 7/2001 | |
| EP | 1250059 | 7/2001 | |
| EP | 1157692 | 11/2001 | |
| EP | 1392411 | 11/2002 | |
| EP | 1436370 | 4/2003 | |
| EP | 1523541 | 1/2004 | |
| EP | 1534807 | 1/2004 | |
| EP | 1685222 | 6/2005 | |
| EP | 1749079 | 10/2005 | |
| EP | 1982752 | 10/2008 | |
| EP | 2173184 | 1/2009 | |
| EP | 2173699 | 1/2009 | |
| EP | 2169038 | 3/2010 | |
| EP | 2295529 | 7/2012 | |
| FR | 2103302 | 7/1971 | |
| FR | 2651148 | 3/1991 | |
| FR | 2651149 | 3/1991 | |
| FR | 2897238 | 8/2007 | |
| GB | 2221843 | 2/1990 | |
| HK | 1078509 | 6/2006 | |
| JP | 58-088339 | 5/1983 | |
| JP | 58-109444 | 6/1983 | |
| JP | 60-208940 | 10/1985 | |
| JP | 61-192797 | 8/1986 | |
| JP | S6388159 | 4/1988 | |
| JP | 01-197596 | 8/1989 | |
| JP | H01-197596 | 8/1989 | |
| JP | 1992-235701 | 8/1992 | |
| JP | H04-235701 | 8/1992 | |
| JP | 6287594 | 10/1994 | |
| JP | 6287594 A * | 10/1994 | |
| JP | 09-157684 | 6/1997 | |
| JP | H10-310555 | 11/1998 | |
| JP | 11-057302 | 3/1999 | |
| JP | 11-090105 | 4/1999 | |
| JP | 2001139981 | 5/2001 | |
| SI | 1797021 | 4/2009 | |
| WO | WO 94/25552 | 11/1994 | |
| WO | WO-98/32514 | 7/1998 | |
| WO | WO 9947228 | 9/1999 | |
| WO | WO 00/25885 | 5/2000 | |
| WO | WO 01/87451 | 11/2001 | |
| WO | WO 01/87452 | 11/2001 | |
| WO | WO 01/87924 | 11/2001 | |
| WO | WO 2005/100519 | 10/2005 | |
| WO | WO 2007/012750 | 2/2007 | |
| WO | WO 2007/017240 | 2/2007 | |
| WO | WO 2007/038417 | 4/2007 | |

(56) References Cited

FOREIGN PATENT DOCUMENTS

| | | |
|---|---|---|
| WO | WO 2007/075499 | 7/2007 |
| WO | WO 2007075499 A2 * | 7/2007 |
| WO | WO 2007/093690 | 8/2007 |
| WO | WO 2007/147554 | 12/2007 |
| WO | WO 2008/004900 | 1/2008 |
| WO | WO 2008/107562 | 9/2008 |
| WO | WO 2008/149177 | 12/2008 |
| WO | WO 2009/047408 | 4/2009 |
| WO | WO 2009/105351 | 8/2009 |
| WO | WO 2009105351 A1 * | 8/2009 |
| WO | WO 2010/018423 | 2/2010 |
| WO | WO 2010/119319 | 10/2010 |
| WO | WO 2011/080503 | 7/2011 |
| WO | WO 2013/005046 | 1/2013 |
| WO | WO 2013/005048 | 1/2013 |
| WO | WO 2013/005051 | 1/2013 |
| WO | WO 2013/005052 | 1/2013 |
| ZA | 8905758 | 4/1990 |

OTHER PUBLICATIONS

Xie, et al., "Biotechnology Progress", *American Institute of Chemical Engineers* vol. 18, No. 6 2002, 1332-1344.

Quan, Wenqin et al., "Determination of eicosapentaenoic acid and docosahexaenoic acid in fish oil by high performance liquid chromatography/mass spectrometry", *Food & Machinery*, vol. 24, No. 2, pp. 114-117. Mar. 31, 2008, 4 pages.

Quan, Wenqin, "Study on the enrichment of glyceride of ω-3PUFA", *Chinese Master's Theses Full-text Database Basic Sciences*, A0062-42 Mar. 15, 2009, 77 pages.

Non-Final Office Action in U.S. Appl. No. 13/880,150, dated Oct. 9, 2015, 20 pages.

Quan, Wenqin, "Study on the enrichment of glyceride of ω-3PUFA", *Chinese Master's Theses Full-text Database Basic Sciences*, A0062-42 Mar. 15, 2009, 77 pages.

Quan, Wenqin et al., "Determination of eicosapentaenoic acid and docosahexaenoic acid in fish oil by high performance liquid chromatography/mass spectrometry", *Food & Machinery*, vol. 24, No. 2, pp. 114-117 (English translation without bibliography) Mar. 31, 2008, 3 pgs.

Guiochon, Georges et al., "Fundamentals of Preparative and Nonlinear Chromatography", *Elsevier* 2006, 833-835.

Heinisch, Sabine et al., "Sense and nonsense of high-temperature liquid chromatography", *Journal of Chromatography A* 1216 2009, 642-658.

Non-Final Office Action in U.S. Appl. No. 14/759,764, dated Dec. 31, 2015, 21 pages.

Non-Final Office Action in U.S. Appl. No. 14/870,873, dated Jan. 20, 2016, 14 pages.

* cited by examiner

10A

10B

10C

FIRST SEPARATION STEP                    SECOND SEPARATION STEP

→ FLOW OF ELUENT                         → FLOW OF ELUENT

← FLOW OF ADSORBENT                      ← FLOW OF ADSORBENT

HEATED CHROMATOGRAPHIC SEPARATION PROCESS

The present invention relates to an improved chromatographic separation process for purifying polyunsaturated fatty acids (PUFAs) and derivatives thereof. In particular, the present invention relates to an improved chromatographic separation process which allows a reduced amount of eluent to be used.

BACKGROUND OF THE INVENTION

Fatty acids, in particular PUFAs, and their derivatives are precursors for biologically important molecules, which play an important role in the regulation of biological functions such as platelet aggregation, inflammation and immunological responses. Thus, PUFAs and their derivatives may be therapeutically useful in treating a wide range of pathological conditions including CNS conditions; neuropathies, including diabetic neuropathy; cardiovascular diseases; general immune system and inflammatory conditions, including inflammatory skin diseases.

PUFAs are found in natural raw materials, such as vegetable oils and marine oils. Such PUFAs are, however, frequently present in such oils in admixture with saturated fatty acids and numerous other impurities. PUFAs should therefore desirably be purified before nutritional or pharmaceutical uses.

Unfortunately, PUFAs are extremely fragile. Thus, when heated in the presence of oxygen, they are prone to isomerization, peroxidation and oligomerization. The fractionation and purification of PUFA products to prepare pure fatty acids is therefore difficult. Distillation, even under vacuum, can lead to non-acceptable product degradation.

Chromatographic separation techniques are well known to those of skill in the art. Chromatographic separation techniques involving stationary bed systems and simulated or actual moving bed systems are both familiar to one of skill in the art.

In a conventional stationary bed chromatographic system, a mixture whose components are to be separated percolates through a container. The container is generally cylindrical, and is typically referred to as the column. The column contains a packing of a porous material (generally called the stationary phase) exhibiting a high permeability to fluids. The percolation velocity of each component of the mixture depends on the physical properties of that component so that the components exit from the column successively and selectively. Thus, some of the components tend to fix strongly to the stationary phase and thus will percolate slowly, whereas others tend to fix weakly and exit from the column more quickly. Many different stationary bed chromatographic systems have been proposed and are used for both analytical and industrial production purposes.

Simulated and actual moving bed chromatography are known techniques, familiar to those of skill in the art. The principle of operation involves countercurrent movement of a liquid eluent phase and a solid adsorbent phase. This operation allows minimal usage of solvent making the process economically viable. Such separation technology has found several applications in diverse areas, including hydrocarbons, industrial chemicals, oils, sugars and APIs.

Thus, a simulated moving bed chromatography apparatus consists of a number of individual columns containing adsorbent which are connected together in series. Eluent is passed through the columns in a first direction. The injection points of the feedstock and the eluent, and the separated component collection points in the system, are periodically shifted by means of a series of valves. The overall effect is to simulate the operation of a single column containing a moving bed of the solid adsorbent, the solid adsorbent moving in a countercurrent direction to the flow of eluent. Thus, a simulated moving bed system consists of columns which, as in a conventional stationary bed system, contain stationary beds of solid adsorbent through which eluent is passed, but in a simulated moving bed system the operation is such as to simulate a continuous countercurrent moving bed.

A typical simulated moving bed chromatography apparatus is illustrated with reference to FIG. 1. The concept of a simulated or actual moving bed chromatographic separation process is explained by considering a vertical chromatographic column containing stationary phase S divided into sections, more precisely into four superimposed sub-zones I, II, III and IV going from the bottom to the top of the column. The eluent is introduced at the bottom at IE by means of a pump P. The mixture of the components A and B which are to be separated is introduced at IA+B between sub-zone II and sub-zone III. An extract containing mainly B is collected at SB between sub-zone I and sub-zone II, and a raffinate containing mainly A is collected at SA between sub-zone III and sub-zone IV.

In the case of a simulated moving bed system, a simulated downward movement of the stationary phase S is caused by movement of the introduction and collection points relative to the solid phase. In the case of an actual moving bed system, simulated downward movement of the stationary phase S is caused by movement of the various chromatographic columns relative to the introduction and collection points. In FIG. 1, eluent flows upward and mixture A+B is injected between sub-zone II and sub-zone III. The components will move according to their chromatographic interactions with the stationary phase, for example adsorption on a porous medium. The component B that exhibits stronger affinity to the stationary phase (the slower running component) will be more slowly entrained by the eluent and will follow it with delay. The component A that exhibits the weaker affinity to the stationary phase (the faster running component) will be easily entrained by the eluent. If the right set of parameters, especially the flow rate in each sub-zone, are correctly estimated and controlled, the component A exhibiting the weaker affinity to the stationary phase will be collected between sub-zone III and sub-zone IV as a raffinate and the component B exhibiting the stronger affinity to the stationary phase will be collected between sub-zone I and sub-zone II as an extract.

It will therefore be appreciated that the conventional simulated moving bed system schematically illustrated in FIG. 1 is limited to binary fractionation.

Processes and equipment for simulated moving bed chromatography are described in several patents, including U.S. Pat. No. 2,985,589, U.S. Pat. No. 3,696,107, U.S. Pat. No. 3,706,812, U.S. Pat. No. 3,761,533, FR-A-2103302, FR-A-2651148 and FR-A-2651149, the entirety of which are incorporated herein by reference. The topic is also dealt with at length in "Preparative and Production Scale Chromatography", edited by Ganetsos and Barker, Marcel Dekker Inc, New York, 1993, the entirety of which is incorporated herein by reference.

An actual moving bed system is similar in operation to a simulated moving bed system. However, rather than shifting the injection points of the feed mixture and the eluent, and the separated component collection points by means of a system of valves, instead a series of adsorption units (i.e. columns)

are physically moved relative to the feed and drawoff points. Again, operation is such as to simulate a continuous countercurrent moving bed.

Processes and equipment for actual moving bed chromatography are described in several patents, including U.S. Pat. No. 6,979,402, U.S. Pat. No. 5,069,883 and U.S. Pat. No. 4,764,276, the entirety of which are incorporated herein by reference.

Purification of PUFA products is particularly challenging. Thus, many suitable feedstocks for preparing PUFA products are extremely complex mixtures containing a large number of different components with very similar retention times in chromatography apparatuses. It is therefore very difficult to separate therapeutically useful PUFAs from such feedstocks. However, a high degree of purity of PUFA products is required, particularly for pharmaceutical and nutraceutical applications. Historically, therefore, distillation has been used when high purity PUFA products are required. There are, however, significant drawbacks to using distillation as a separation technique for delicate PUFAs as discussed above.

In general, all chromatographic separation techniques for separating PUFAs utilise large volumes of organic solvents as eluents. After the chromatographic separation process is completed the PUFAs must be recovered from solution in the eluent. Typically a large expenditure of time and energy is involved in recovering PUFAs from solution in the eluent. Furthermore, organic solvents used as eluents in chromatographic separation processes are frequently harmful to the environment or to the operatives handling them. Therefore, a chromatographic separation process which reduces the amount of organic solvent that needs to be used is required.

As discussed above, suitable commercial feedstocks, for example fish oils, containing PUFAs typically contain a large number of different components with very similar retention times in chromatography apparatuses. There is therefore also a requirement for a chromatographic separation process which improves the resolution between components of a feed mixture having similar retention times.

SUMMARY OF THE INVENTION

It has advantageously been found that a chromatographic separation process carried out at a temperature above room temperature requires less organic solvent eluent. Thus, at elevated temperatures, retention times for many PUFAs of commercial interest are substantially reduced, which in turn means that less organic solvent eluent must be used to separate a mixture containing a variety of different PUFAs, for example a fish oil feedstock, or a feedstock derived from fish oils.

It has also advantageously been found that increasing the amount of water used in a chromatographic separation process utilising an aqueous organic solvent improves the resolution of components present in feed mixtures having similar retention times. This means that an eluent having a higher water content allows a cleaner separation of a PUFA product from a feed mixture.

The present invention therefore provides a chromatographic separation process for recovering a polyunsaturated fatty acid (PUFA) product from a feed mixture, which process comprises passing the feed mixture through one or more chromatographic columns containing, as eluent, an aqueous organic solvent, wherein the temperature of at least one of the chromatographic columns through which the feed mixture is passed is greater than room temperature.

DETAILED DESCRIPTION OF THE INVENTION

Figure 1:
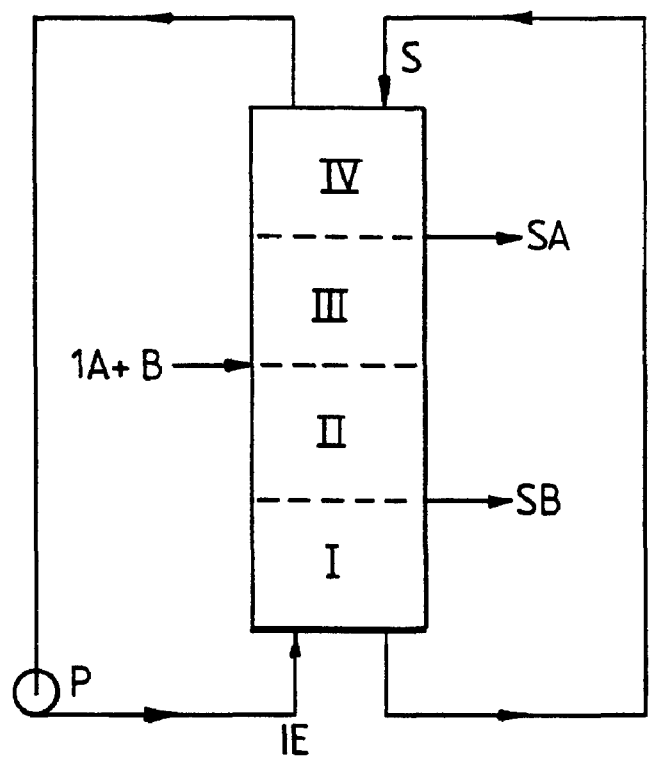
FIG. 1 illustrates the basic principles of a simulated or actual moving bed process for separating a binary mixture.

As used herein, the term "PUFA product" refers to a product comprising one or more polyunsaturated fatty acids (PUFAs), and/or derivatives thereof, typically of nutritional or pharmaceutical significance. Typically, the PUFA product is a single PUFA or derivative thereof. Alternatively, the PUFA product is a mixture of two or more PUFAs or derivatives thereof, for example two.

The term "polyunsaturated fatty acid" (PUFA) refers to fatty acids that contain more than one double bond. Such PUFAs are well known to the person skilled in the art. As used herein, a PUFA derivative is a PUFA in the form of a mono-, di- or tri-glyceride, ester, phospholipid, amide, lactone, or salt. Triglycerides and esters are preferred. Esters are more preferred. Esters are typically alkyl esters, preferably $C_1$-$C_6$ alkyl esters, more preferably $C_1$-$C_4$ alkyl esters. Examples of esters include methyl and ethyl esters. Ethyl esters are most preferred.

Typically, the PUFA product comprises at least one ω-3 or ω-6 PUFA, preferably at least one ω-3 PUFA. Examples of ω-3 PUFAs include alpha-linolenic acid (ALA), stearidonic acid (SDA), eicosatrienoic acid (ETE), eicosatetraenoic acid (ETA), eicosapentaenoic acid (EPA), docosapentaenoic acid (DPA) and docosahexaenoic acid (DHA). SDA, EPA, DPA and DHA are preferred. EPA and DHA are more preferred. Examples of ω-6 PUFAs include linoleic acid (LA), gamma-linolenic acid (GLA), eicosadienoic acid, dihomo-gamma-linolenic acid (DGLA), arachidonic acid (ARA), docosadienoic acid, adrenic acid and docosapentaenoic (ω-6) acid. LA, ARA, GLA and DGLA are preferred.

In one embodiment, the PUFA product is EPA and/or EPA ethyl ester (EE)

In another embodiment, the PUFA product is DHA and/or DHA ethyl ester (EE).

In a yet further embodiment, the PUFA product is a mixture of EPA and DHA and/or EPA EE and DHA EE.

In a most preferred embodiment, the PUFA product is EPA or EPA ethyl ester which is produced in greater than 90% purity, preferably greater than 95% purity, and more preferably greater than 97% purity.

Typically, in addition to said PUFA product, an additional secondary PUFA product is collected in the chromatographic separation process of the invention. Preferably, the PUFA product is EPA and the additional secondary PUFA product is DHA.

In a further embodiment of the invention, the apparatus is configured to collect a PUFA product which is a concentrated mixture of EPA and DHA. Thus, a feed mixture is used which contains EPA, DHA, components which are more polar than EPA and DHA, and components which are less polar than EPA and DHA. In the first separation step, less polar material than EPA and DHA is typically removed. In the second separation step, material which is more polar than EPA and DHA is typically removed, and a concentrated mixture of EPA and DHA is collected as the PUFA product.

Suitable feed mixtures for fractionating by the process of the present invention may be obtained from natural sources including vegetable and animal oils and fats, and from synthetic sources including oils obtained from genetically modified plants, animals and micro organisms including yeasts. Examples include fish oils, algal and microalgal oils and plant oils, for example borage oil, Echium oil and evening primrose oil. In one embodiment, the feed mixture is a fish oil. In another embodiment, the feed mixture is an algal oil. Algal oils are particularly suitable when the desired PUFA product is EPA and/or DHA. Genetically modified Safflower oil is particularly suitable when the desired PUFA product is GLA. Genetically modified yeast is particularly suitable when the desired PUFA product is EPA.

In a particularly preferred embodiment the feed mixture is a fish oil or fish-oil derived feedstock. It has advantageously been found that when a fish-oil or fish-oil derived feed stock is used, an EPA or EPA ethyl ester PUFA product can be produced by the process of the present invention in greater than 90% purity, preferably greater than 95% purity, and more preferably greater than 97% purity.

The feed mixture may undergo chemical treatment before fractionation by the process of the invention. For example, it may undergo glyceride transesterification or glyceride hydrolysis followed in certain cases by selective processes such as crystallisation, molecular distillation, urea fractionation, extraction with silver nitrate or other metal salt solutions, iodolactonisation or supercritical fluid fractionation. Alternatively, a feed mixture may be used directly with no initial treatment step.

The feed mixtures typically contain the PUFA product and at least one more polar component and at least one less polar component. The less polar components have a stronger adherence to the adsorbent used in the process of the present invention than does the PUFA product. During operation, such less polar components typically move with the solid adsorbent phase in preference to the liquid eluent phase. The more polar components have a weaker adherence to the adsorbent used in the process of the present invention than does the PUFA product. During operation, such more polar components typically move with the liquid eluent phase in preference to the solid adsorbent phase. In general, more polar components will be separated into a raffinate stream, and less polar components will be separated into an extract stream.

Examples of the more and less polar components include (1) other compounds occurring in natural oils (e.g. marine oils or vegetable oils), (2) byproducts formed during storage, refining and previous concentration steps and (3) contaminants from solvents or reagents which are utilized during previous concentration or purification steps.

Examples of (1) include other unwanted PUFAs; saturated fatty acids; sterols, for example cholesterol; vitamins; and environmental pollutants, such as polychlorobiphenyl (PCB), polyaromatic hydrocarbon (PAH) pesticides, chlorinated pesticides, dioxines and heavy metals. PCB, PAH, dioxines and chlorinated pesticides are all highly non-polar components.

Examples of (2) include isomers and oxidation or decomposition products from the PUFA product, for instance, auto-oxidation polymeric products of fatty acids or their derivatives.

Examples of (3) include urea which may be added to remove saturated or mono-unsaturated fatty acids from the feed mixture.

Preferably, the feed mixture is a PUFA-containing marine oil (e.g. a fish oil), more preferably a marine oil (e.g. a fish oil) comprising EPA and/or DHA.

A typical feed mixture for preparing concentrated EPA (EE) by the process of the present invention comprises 50-75% EPA (EE), 0 to 10% DHA (EE), and other components including other essential ω-3 and ω-6 fatty acids.

A preferred feed mixture for preparing concentrated EPA (EE) by the process of the present invention comprises 55% EPA (EE), 5% DHA (EE), and other components including other essential ω-3 and ω-6 fatty acids. DHA (EE) is less polar than EPA (EE).

A typical feed mixture for preparing concentrated DHA (EE) by the process of the present invention comprises 50-75% DHA (EE), 0 to 10% EPA (EE), and other components including other essential ω-3 and ω-6 fatty acids.

A preferred feed mixture for preparing concentrated DHA (EE) by the process of the present invention comprises 75% DHA (EE), 7% EPA (EE) and other components including other essential ω-3 and ω-6 fatty acids. EPA (EE) is more polar than DHA (EE).

A typical feed mixture for preparing a concentrated mixture of EPA (EE) and DHA (EE) by the process of the present invention comprises greater than 33% EPA (EE), and greater than 22% DHA (EE).

Typically, the temperature of all of the chromatographic columns used in the process of the present invention is greater than room temperature.

As will be appreciated, in the at least one chromatographic column which is at a temperature greater than room temperature, it is the interior of the column which is important to the separation process. Thus, it is typically the aqueous organic solvent eluent and adsorbent inside the chromatographic column which is at the temperature greater than room temperature. It is, of course, possible to achieve the required temperature inside the at least one chromatographic column by internal (for example by heating the eluent and/or feed mixture) and/or external means (for example by heating the outside of the chromatographic column by any known conventional means).

Typically, the required elevated temperature of the heated chromatographic columns is achieved by heating the aqueous organic solvent eluent and/or feed mixture. This has the effect of heating the columns internally.

Thus, the temperature of at least one of the chromatographic columns through which the feed mixture is passed can also be measured as the temperature of the aqueous organic solvent eluent.

Thus, the present invention also provides a chromatographic separation process for recovering a polyunsaturated fatty acid (PUFA) product from a feed mixture, which process comprises passing the feed mixture through one or more chromatographic columns containing, as eluent, an aqueous organic solvent, wherein the temperature of the eluent is greater than room temperature, as defined herein.

Alternatively, the required temperature of at least one of the chromatographic columns is achieved by heating the columns. The heating may be carried out using, for example, an electric heating mantle, a heated water jacket or coil or by radiative heat lamps. The interior and/or exterior of the one or more chromatographic columns is typically heated.

The required temperature of at least one of the chromatographic columns may be achieved by heating the columns and/or the aqueous organic solvent eluent, and/or the feed mixture.

Typically, the temperature of at least one of the chromatographic columns is greater than 30° C., preferably greater than 35° C., more preferably greater than 40° C., even more preferably greater than 45° C., even more preferably greater than 50° C., even more preferably greater than 55° C., and even more preferably greater than 57° C. A temperature of 56° C. is useful in certain embodiments.

Typically, the temperature of at least one of the chromatographic columns is up to 100° C., preferably up to 95° C., more preferably up to 90° C., even more preferably up to 85° C., even more preferably up to 80° C., even more preferably up to 75° C., and even more preferably up to 70° C.

Thus, typical temperature ranges for at least one of the chromatographic columns are from 30 to 100° C., from 35 to 95° C., from 40 to 90° C., from 45 to 85° C., from 50 to 80° C., from 55 to 75° C. or from 57 to 70° C.

Preferred temperature ranges for at least one of the chromatographic columns are from 40 to 70° C., preferably from 50 to 67° C., more preferably from 56 to 65° C., even more preferably from 57 to 63° C.

The process of the present invention involves passing a feed mixture through one or more chromatographic columns. Any known chromatographic columns may be used in the claimed process.

The one or more chromatographic columns typically contains an adsorbent. Conventional adsorbents known in the art for chromatographic separation techniques may be used in the process of the present invention. When more than one chromatographic column is used, each chromatographic column may contain the same or a different adsorbent. Typically, when more than one chromatographic column is used each column contains the same adsorbent. Examples of such commonly used materials are polymeric beads, preferably polystyrene reticulated with DVB (divinylbenzene); and silica gel, preferably reverse phase bonded silica gel with C8 or C18 alkanes, especially C18. C18 bonded reverse phase silica gel is preferred. The adsorbent used in the process of the present invention is preferably non-polar.

The shape of the adsorbent stationary phase material may be, for example, spherical or nonspherical beads, preferably substantially spherical beads. Such beads typically have a diameter of 5 to 500 microns, preferably 10 to 500 microns, more preferably 15 to 500 microns, more preferably 40 to 500 microns, more preferably 100 to 500 microns, more preferably 250 to 500 microns, even more preferably 250 to 400 microns, most preferably 250 to 350 microns. In some embodiments, beads with a diameter of 5 to 35 microns may be used, typically 10 to 30 microns, preferably 15 to 25 microns. Some preferred particle sizes are somewhat larger than particle sizes of beads used in the past in simulated and actual moving bed processes. Use of larger particles enables a lower pressure of eluent to be used in the system. This, in turn, has advantages in terms of cost savings, efficiency and lifetime of the apparatus. It has surprisingly been found that adsorbent beads of large particle size may be used in the process of the present invention (with their associated advantages) without any loss in resolution.

The dimensions of the columns used are not particularly limited, and will depend to some extent on the volume of feed mixture to be purified. A skilled person would easily be able to determine appropriately sized columns to use. The diameter of each column is typically between 10 and 1000 mm, preferably between 10 and 500 mm, more preferably between 25 and 250 mm, even more preferably between 50 and 100 mm, and most preferably between 70 and 80 mm. The length of each column is typically between 10 and 300 cm, preferably between 10 and 200 cm, more preferably between 25 and 150 cm, even more preferably between 70 and 110 cm, and most preferably between 80 and 100 cm.

The eluent used in the process of the present invention is an aqueous organic solvent.

The aqueous organic solvent typically comprises water and one or more alcohols, ethers, esters, ketones or nitriles, or mixtures thereof.

Alcohol solvents are well known to the person skilled in the art. Alcohols are typically short chain alcohols. Alcohols typically are of formula ROH, wherein R is a straight or branched $C_1$-$C_6$ alkyl group. The $C_1$-$C_6$ alkyl group is preferably unsubstituted. Examples of alcohols include methanol, ethanol, n-propanol, i-propanol, n-butanol, i-butanol, s-butanol and t-butanol. Methanol and ethanol are preferred. Methanol is more preferred.

Ether solvents are well known to the person skilled in the art. Ethers are typically short chain ethers. Ethers typically are of formula R—O—R', wherein R and R' are the same or different and represent a straight or branched $C_1$-$C_6$ alkyl group. The $C_1$-$C_6$ alkyl group is preferably unsubstituted. Preferred ethers include diethylether, diisopropylether, and methyl t-butyl ether (MTBE).

Ester solvents are well known to the person skilled in the art. Esters are typically short chain esters. Esters typically are of formula R—(C=O)O—R', wherein R and R' are the same or different and represent a straight or branched $C_1$-$C_6$ alkyl group. Preferred esters include methylacetate and ethylacetate.

Ketone solvents are well known to the person skilled in the art. Ketones are typically short chain ketones. Ketones typically are of formula R—(C=O)—R', wherein R and R' are the same or different and represent a straight or branched $C_1$-$C_6$ alkyl group. The $C_1$-$C_6$ alkyl group is preferably unsubstituted. Preferred ketones include acetone, methylethylketone and methyl isobutyl ketone (MIBK).

Nitrile solvents are well known to the person skilled in the art. Nitriles are typically short chain nitriles. Nitriles typically are of formula R—CN, wherein R represents a straight or branched $C_1$-$C_6$ alkyl group. The $C_1$-$C_6$ alkyl group is preferably unsubstituted. Preferred nitriles include acetonitrile.

Typically, the aqueous organic solvent is aqueous alcohol or aqueous acetonitrile.

The aqueous organic solvent is preferably aqueous methanol or aqueous acetonitrile. Aqueous methanol is more preferred.

Typically, the eluent is not in a supercritical state. Typically, the eluent is a liquid.

Typically, the average water:organic solvent ratio, for example water:methanol ratio, of the eluent in the entire apparatus is from 0.1:99.9 to 12:88 parts by volume, preferably from 0.25:99.75 to 10:90 parts by volume, and more preferably from 0.5:99.5 to 9:91 parts by volume. In some embodiments the average water:organic solvent ratio, for example water:methanol ratio, of the eluent in the entire apparatus is preferably from 0.1:99.9 to 9:91 parts by volume, more preferably from 0.25:99.75 to 7:93 parts by volume, even more preferably from 0.5:99.5 to 6:94 parts by volume. In other embodiments, the average water:organic solvent ratio, for example water:methanol ratio, of the eluent in the entire apparatus is preferably from 4:96 to 12:88 parts by volume, preferably from 6:94 to 10:90 parts by volume, more preferably from 7:93 to 9:91 parts by volume, and even more preferably from 7.5:92.5 to 8.5:91.5 parts by volume.

When the aqueous organic solvent is aqueous acetonitrile, the eluent typically contains up to 30 wt % water, remainder acetonitrile. Preferably, the eluent contains from 5 to 25 wt % water, remainder acetonitrile. More preferably, the eluent contains from 10 to 20 wt % water, remainder acetonitrile. Even more preferably, the eluent contains from 15 to 25 wt % water, remainder acetonitrile.

Typically, the eluent contains 5 wt % water or greater, based on the total weight of the water and organic solvent. Preferably, the eluent contains 6 wt % water or greater, more preferably 7 wt % water or greater, even more preferably about 8 wt % water. Thus, the eluent typically contains from 5 to 15 wt % water, preferably from 6 to 13 wt % water, more preferably from 7 to 11 wt % water, even more preferably from 7.5 to 9.5 wt % water, even more preferably from 7.5 to 8.5 wt % water. Advantageously, this increased water content improves the resolution of closely related components present in the feed mixture. An increased water content of the eluent can under certain circumstances necessitate a larger volume of eluent being used. In practice, this is offset by heating at least one of the chromatographic columns through which the feed mixture is passed to a temperature greater than room temperature, preferably by heating the eluent to a temperature greater than room temperature. Heating the column and/or eluent in this way reduces the amount of solvent which needs to be used.

Any known chromatography apparatus may be used for the purposes of the process of the present invention, as long as it involves passing a feed mixture through one or more chromatographic columns containing, as eluent, an aqueous organic solvent, wherein the temperature of at least one of the chromatographic columns through which the feed mixture is passed is greater than room temperature.

Each separation step of the process of the present invention is carried out in a simulated or actual moving bed chromatography apparatus.

The number of chromatographic columns used in the process of the present invention is not particularly limited. In certain embodiments a single chromatographic column may be used. Thus, such embodiments typically involve a single stationary column.

In other embodiments, more than one chromatographic column is used. This may involve passing the feed mixture through two or more chromatographic columns, which may be the same or different, arranged in series or in parallel. The number of columns used in this embodiment is not particularly limited, but typically does not exceed thirty columns.

One particular embodiment where multiple chromatographic columns are used is simulated or actual moving bed chromatography.

Thus, the process of the present invention typically comprises introducing the feed mixture into one or more simulated or actual moving bed chromatography apparatuses having a plurality of linked chromatography columns containing, as eluent, an aqueous organic solvent, wherein the temperature of at least one of the plurality of linked chromatographic columns is greater than room temperature.

Typically, the temperature of substantially all of the linked chromatographic columns is greater than room temperature. Preferably, the temperature of all of the linked chromatographic columns is greater than room temperature.

Any known simulated or actual moving bed chromatography apparatus may be utilised for the purposes of the method of the present invention, as long as the apparatus is used in accordance with the process of the present invention. Those apparatuses described in U.S. Pat. No. 2,985,589, U.S. Pat. No. 3,696,107, U.S. Pat. No. 3,706,812, U.S. Pat. No. 3,761,533, FR-A-2103302, FR-A-2651148, FR-A-2651149, U.S. Pat. No. 6,979,402, U.S. Pat. No. 5,069,883 and U.S. Pat. No. 4,764,276 may all be used if configured in accordance with the process of the present invention.

In one embodiment, the process comprises the steps of:

(i) purifying the feed mixture in a first separation step in a simulated or actual moving bed chromatography apparatus having a plurality of linked chromatography columns containing, as eluent, an aqueous organic solvent, to obtain an intermediate product; and (ii) purifying the intermediate product obtained in (i) in a second separation step using a simulated or actual moving bed chromatography apparatus having a plurality of linked chromatography columns containing, as eluent, an aqueous organic solvent, to obtain the PUFA product;

wherein the temperature of one or more of the plurality of linked chromatography columns in the first separation step and/or one or more of the plurality of linked chromatography columns in the second separation step is greater than room temperature; and wherein (a) the first and second separation steps are carried out sequentially on the same chromatography apparatus, the intermediate product being recovered between the first and second separation steps and the process conditions in the chromatography apparatus being adjusted between the first and second separation steps such that the PUFA product is separated from different components of the feed mixture in each separation step; or (b) the first and second separation steps are carried out on separate first and second chromatography apparatuses respectively, the intermediate product obtained from the first separation step being introduced into the second chromatography apparatus, and the PUFA product being separated from different components of the feed mixture in each separation step.

In this embodiment, the term "simulated or actual moving bed chromatography apparatus" typically refers to a plurality of linked chromatography columns containing, as eluent, an aqueous organic solvent, and having one or more injection points for a feed mixture stream, one or more injection points for water and/or organic solvent, a raffinate take-off stream from which liquid can be collected from said plurality of linked chromatography columns, and an extract take-off stream from which liquid can be collected from said plurality of linked chromatography columns.

The chromatography apparatus used in this embodiment has a single array of chromatography columns linked in series containing, as eluent, an aqueous organic solvent. Typically, each of the chromatography columns are linked to the two columns in the apparatus adjacent to that column. Thus, the output from a given column in the array is connected to the input of the adjacent column in the array, which is downstream with respect to the flow of eluent in the array. Thus, eluent can flow around the array of linked chromatography columns. Typically, none of the chromatography columns are linked to non-adjacent columns in the apparatus.

As used herein, the term "nonadjacent" refers to columns, in for example the same apparatus, separated by one or more columns, preferably 3 or more columns, more preferably 5 or more columns, most preferably about 5 columns.

Typically in this embodiment, each apparatus has only one injection point for a feed mixture. In one embodiment, each apparatus has only one injection point for the aqueous organic solvent eluent. In another embodiment, each apparatus has two or more injection points for water and/or organic solvent.

The term "raffinate" is well known to the person skilled in the art. In the context of actual and simulated moving bed chromatography it refers to the stream of components that move more rapidly with the liquid eluent phase compared with the solid adsorbent phase. Thus, a raffinate stream is typically enriched with more polar components, and depleted of less polar components compared with a feed stream.

The term "extract" is well known to the person skilled in the art. In the context of actual and simulated moving bed chromatography it refers to the stream of components that move more rapidly with the solid adsorbent phase compared with the liquid eluent phase. Thus, an extract stream is typically enriched with less polar components, and depleted of more polar components compared with a feed stream.

The number of columns used in each apparatus in this embodiment is not particularly limited. A skilled person would easily be able to determine an appropriate number of columns to use. The number of columns is typically 4 or more, preferably 6 or more, more preferably 8 or more, for example 4, 5, 6, 7, 8, 9, or 10 columns. In preferred embodiment, 5 or 6 columns, more preferably 6 columns. are used. In another preferred embodiment, 7 or 8 columns, more preferably 8 columns are used. Typically, there are no more than 25 columns, preferably no more than 20, more preferably no more than 15.

In this embodiment, the chromatographic apparatuses used in the first and second separation steps typically contain the same number of columns. For certain applications they may have different numbers of columns.

In this embodiment, the columns in the chromatographic apparatuses used in the first and second separation steps typically have identical dimensions but may, for certain applications, have different dimensions.

The flow rates to the column are limited by maximum pressures across the series of columns and will depend on the column dimensions and particle size of the solid phases. One skilled in the art will easily be able to establish the required flow rate for each column dimension to ensure efficient desorption. Larger diameter columns will in general need higher flows to maintain linear flow through the columns.

In this embodiment, for the typical column sizes outlined above, typically the flow rate of eluent into the chromatographic apparatus used in the first separation step is from 1 to 4.5 L/min, preferably from 1.5 to 2.5 L/min. Typically, the flow rate of the extract from the chromatographic apparatus used in the first separation step is from 0.1 to 2.5 L/min, preferably from 0.5 to 2.25 L/min. In embodiments where part of the extract from the first separation step is recycled back into the apparatus used in the first separation step, the flow rate of recycle is typically from 0.7 to 1.4 L/min, preferably about 1 L/min. Typically, the flow rate of the raffinate from the chromatographic apparatus used in the first separation step is from 0.2 to 2.5 L/min, preferably from 0.3 to 2.0 L/min. In embodiments where part of the raffinate from the first separation step is recycled back into the apparatus used in the first separation step, the flow rate of recycle is typically from 0.3 to 1.0 L/min, preferably about 0.5 L/min. Typically, the flow rate of introduction of the feed mixture into the chromatographic apparatus used in the first separation step is from 5 to 150 mL/min, preferably from 10 to 100 mL/min, more preferably from 20 to 60 mL/min.

In this embodiment, for the typical column sizes outlined above, typically the flow rate of eluent into the chromatographic apparatus used in the second separation step is from 1 to 4 L/min, preferably from 1.5 to 3.5 L/min. Typically, the flow rate of the extract from the chromatographic apparatus used in the second separation step is from from 0.5 to 2 L/min, preferably from 0.7 to 1.9 L/min. In embodiments where part of the extract from the second separation step is recycled back into the apparatus used in the second separation step, the flow rate of recycle is typically from 0.6 to 1.4 L/min, preferably from 0.7 to 1.1 L/min, more preferably about 0.9 L/min. Typically, the flow rate of the raffinate from the chromatographic apparatus used in the second separation step is from 0.5 to 2.5 L/min, preferably from 0.7 to 1.8 L/min, more preferably about 1.4 L/min. In embodiments where part of the raffinate from the second separation step is recycled back into the apparatus used in the second separation step, the flow rate of recycle is typically from 0.3 to 1.0 L/min, preferably about 0.5 L/min.

As the skilled person will appreciate, references to rates at which liquid is collected or removed via the various extract and raffinate streams refer to volumes of liquid removed in an amount of time, typically L/minute. Similarly, references to rates at which liquid is recycled back into an apparatus, typically to an adjacent column in the apparatus, refer to volumes of liquid recycled in an amount of time, typically L/minute.

In this embodiment, actual moving bed chromatography is preferred.

The step time, i.e. the time between shifting the points of injection of the feed mixture and eluent, and the various take off points of the collected fractions, is not particularly limited, and will depend on the number and dimensions of the columns used, and the flow rate through the apparatus. A skilled person would easily be able to determine appropriate step times to use in the process of the present invention. The step time is typically from 100 to 1000 seconds, preferably from 200 to 800 seconds, more preferably from about 250 to about 750 seconds. In some embodiments, a step time of from 100 to 400 seconds, preferably 200 to 300 seconds, more preferably about 250 seconds, is appropriate. In other embodiments, a step time of from 600 to 900 seconds, preferably 700 to 800 seconds, more preferably about 750 seconds is appropriate.

In this embodiment, the process of the present invention comprises a first and second separation step.

These two steps can easily be carried out on a single chromatographic apparatus. Thus, in one embodiment, (a) the first and second separation steps are carried out sequentially on the same chromatography apparatus, the intermediate product being recovered between the first and second separation steps and the process conditions in the chromatography apparatus being adjusted between the first and second separation steps such that the PUFA product is separated from different components of the feed mixture in each separation step. A preferred embodiment of this separation process is shown as FIG. 10a. Thus, the first separation step (left hand side) is carried out on an SMB apparatus having 8 columns. Between the first and second separation steps the intermediate product is recovered in, for example, a container, the process conditions in the chromatography apparatus are adjusted such that the PUFA product is separated from different components of the feed mixture in each separation step. The second separation step (right hand side) is then carried out on the same SMB apparatus having 8 columns.

In embodiment (a), adjusting the process conditions typically refers to adjusting the process conditions in the apparatus as a whole, i.e. physically modifying the apparatus so that the conditions are different. It does not refer to simply reintroducing the intermediate product back into a different part of the same apparatus where the process conditions might happen to be different.

Alternatively, first and second separate chromatographic apparatuses can be used in the first and second separation steps. Thus, in another embodiment, (b) the first and second separation steps are carried out on separate first and second chromatography apparatuses respectively, the intermediate product obtained from the first separation step being introduced into the second chromatography apparatus, and the PUFA product being separated from different components of the feed mixture in each separation step.

In embodiment (b), the two separation steps may either be carried out sequentially or simultaneously.

Thus, in embodiment (b) in the case where the two separation steps are carried out sequentially, the first and second separation steps are carried out sequentially on separate first and second chromatography apparatuses respectively, the intermediate product being recovered between the first and second separation steps and the process conditions in the first and second chromatography apparatuses being adjusted such that the PUFA product is separated from different components of the feed mixture in each separation step. A preferred embodiment of this separation process is shown as FIG. 10b. Thus, the first separation step (left hand side) is carried out on an SMB apparatus having 8 columns, one to eight. Between the first and second separation steps the intermediate product is recovered, for example in a container, and then introduced into a second separate SMB apparatus. The second separation step (right hand side) is carried out on the second separate SMB apparatus which has 8 columns, nine to sixteen. The process conditions in the two chromatography apparatuses are adjusted such that the PUFA product is separated from different components of the feed mixture in each separation step.

In embodiment (b) in the case where the two separation steps are carried our simultaneously, the first and second separation steps are carried out on separate first and second chromatography apparatuses respectively, the intermediate product being introduced into the chromatography apparatus used in the second separation step, and the process conditions in the first and second chromatography apparatuses being adjusted such that the PUFA product is separated from different components of the feed mixture in each separation step.

A preferred embodiment of this separation process is shown as FIG. 10c. Thus, the first separation step (left hand side) is carried out on an SMB apparatus having 8 columns, one to eight. The intermediate product obtained in the first separation step is then introduced into the second separate chromatography apparatus used in the second separation step. The intermediate product may be passed from the first separation step to the second separation step directly or indirectly, for example via a container. The second separation step (right hand side) is carried out on the second separate SMB apparatus which has 8 columns, nine to sixteen. The process conditions in the two chromatography apparatuses are adjusted such that the PUFA product is separated from different components of the feed mixture in each separation step.

In embodiment (b) in the case where the two separation steps are carried our simultaneously, eluent circulates separately in the two separate chromatographic apparatuses. Thus, eluent is not shared between the two separate chromatographic apparatuses other than what eluent may be present as solvent in the intermediate product which is purified in the second separation step, and which is introduced into the chromatographic apparatus used in the second separation step. Chromatographic columns are not shared between the two separate chromatographic apparatuses used in the first and second separation steps.

In this embodiment, after the intermediate product is obtained in the first separation step, the aqueous organic solvent eluent may be partly or totally removed before the intermediate product is purified in the second separation step. Alternatively, the intermediate product may be purified in the second separation step without the removal of any solvent present.

As mentioned above, in this embodiment the PUFA product is separated from different components of the feed mixture in each separation step. In embodiment (a), the process conditions of the single SMB apparatus used in both separation steps are adjusted between the first and second separation steps such that the PUFA product is separated from different components of the feed mixture in each separation step. In embodiment (b), the process conditions in the two separate chromatography apparatuses used in the first and second separation steps are set such that the PUFA product is separated from different components of the feed mixture in each separation step.

Thus, in this embodiment the process conditions in the first and second separation steps vary. The process conditions which vary may include, for example, the size of the columns used, the number of columns used, the packing used in the columns, the step time of the SMB apparatus, the temperature of the apparatus, the eluent used in the separation steps, or the flow rates used in the apparatus, in particular the recycle rate of liquid collected via the extract or raffinate streams.

Preferably in this embodiment, the process conditions which may vary are the water:organic solvent ratio of the eluent used in the separation steps, and/or the recycle rate of liquid collected via the extract or raffinate streams in the separation steps. Both of these options are discussed in more detail below.

In this embodiment, the intermediate product obtained in the first separation step is typically enriched in the PUFA product compared to the feed mixture.

In this embodiment, the intermediate product obtained in the first separation step is then introduced into the chromatographic apparatus used in the second separation step.

In this embodiment, the intermediate product is typically collected as the raffinate or extract stream from the chromatographic apparatus used in the first separation process.

Typically in this embodiment, the intermediate product is collected as the raffinate stream in the first separation step, and the PUFA product is collected as the extract stream in the second separation step. Thus, the raffinate stream collected in the first separation step is used as the feed mixture in the second separation step. The raffinate stream collected in the first separation step typically contains the PUFA product together with more polar components.

Alternatively in this embodiment, the intermediate product is collected as the extract stream in the first separation step, and the PUFA product is collected as the raffinate stream in the second separation step. Thus, the extract stream collected in the first separation step is used as the feed mixture in the second separation step. The extract stream collected in the first separation step typically contains the PUFA product together with less polar components.

In this embodiment the PUFA product is separated from different components of the feed mixture in each separation step. Typically, the components separated in each separation step of the process of the present invention have different polarities.

Preferably in this embodiment, the PUFA product is separated from less polar components of the feed mixture in the first separation step, and the PUFA product is separated from more polar components of the feed mixture in the second separation step.

Typically in this embodiment, (a) part of the extract stream from the apparatus used in the first separation step is recycled back into the apparatus used in the first separation step; and/or (b) part of the raffinate stream from the apparatus used in the first separation step is recycled back into the apparatus used in the first separation step; and/or (c) part of the extract stream from the apparatus used in the second separation step is recycled back into the apparatus used in the second separation step; and/or (d) part of the raffinate stream from the apparatus used in the second separation step is recycled back into the apparatus used in the second separation step.

Preferably in this embodiment, (a) part of the extract stream from the apparatus used in the first separation step is recycled back into the apparatus used in the first separation step; and (b) part of the raffinate stream from the apparatus used in the first separation step is recycled back into the apparatus used in the first separation step; and (c) part of the extract stream from the apparatus used in the second separation step is recycled back into the apparatus used in the second separation step; and (d) part of the raffinate stream from the apparatus used in the second separation step is recycled back into the apparatus used in the second separation step.

The recycle in this embodiment involves feeding part of the extract or raffinate stream out of the chromatography apparatus used in the first or second separation step back into the apparatus used in that step, typically into an adjacent column. This adjacent column is the adjacent column which is downstream with respect to the flow of eluent in the system.

In this embodiment the rate at which liquid collected via the extract or raffinate stream in the first or second separation steps is recycled back into the chromatography apparatus used in that step is the rate at which liquid collected via that stream is fed back into the apparatus used in that step, typically into an adjacent column, i.e. the downstream column with respect to the flow of eluent in the system.

Figure 9:
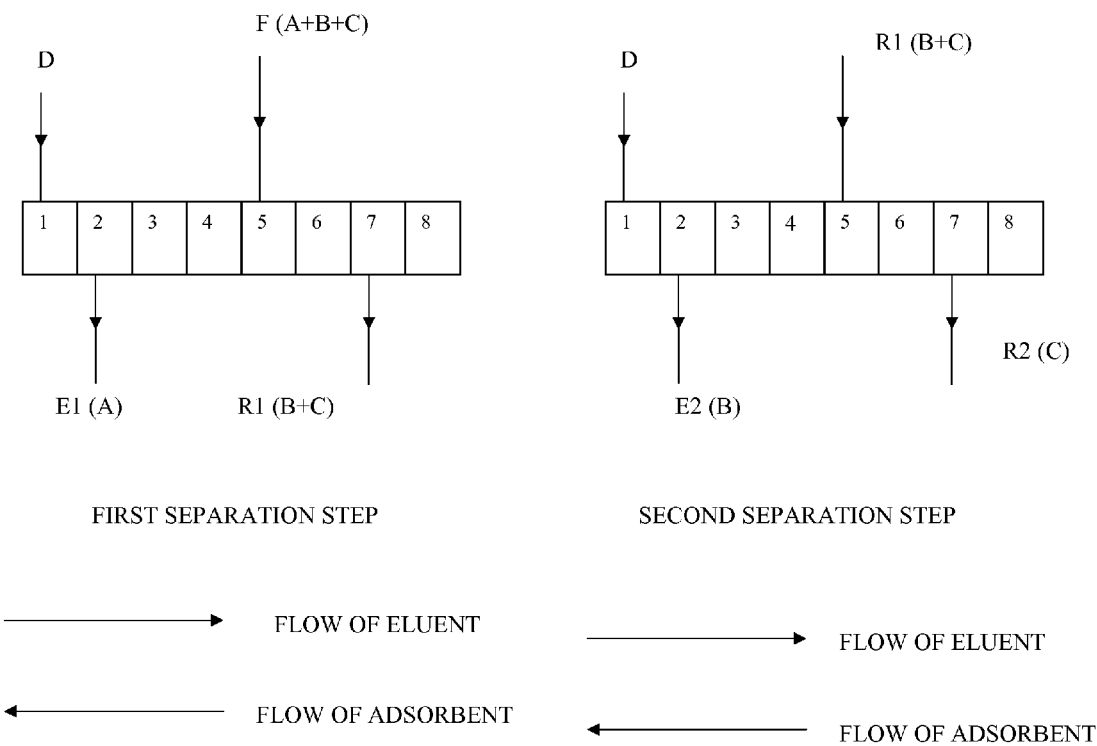
FIG. 9 illustrates an alternative method for one particular embodiment of the invention for purifying EPA from faster and slower running components (i.e. more polar and less polar impurities).

This can be seen with reference to a preferred embodiment in FIG. 9. The rate of recycle of extract in the first separation step is the rate at which extract collected from the bottom of column 2 of the chromatographic apparatus used in the first separation step is fed into the top of column 3 of the chromatographic apparatus used in the first separation step, i.e. the flow rate of liquid into the top of column 3 of the chromatographic apparatus used in the first separation step.

In this embodiment the rate of recycle of extract in the second separation step is the rate at which extract collected at the bottom of column 2 of the chromatographic apparatus used in the second separation step is fed into the top of column 3 of the chromatographic apparatus used in the second separation step, i.e. the flow rate of liquid into the top of column 3 of the chromatographic apparatus used in the second separation step.

In this embodiment recycle of the extract and/or raffinate streams in the first and/or second separation steps is typically effected by feeding the liquid collected via that stream in that separation step into a container, and then pumping an amount of that liquid from the container back into the apparatus used in that separation step, typically into an adjacent column. In this case, the rate of recycle of liquid collected via a particular extract or raffinate stream in the first and/or second separation steps, typically back into an adjacent column, is the rate at which liquid is pumped out of the container back into the chromatography apparatus, typically into an adjacent column.

As the skilled person will appreciate, in this embodiment the amount of liquid being introduced into a chromatography apparatus via the eluent and feedstock streams is balanced with the amount of liquid removed from the apparatus, and recycled back into the apparatus.

Thus, in this embodiment with reference to FIG. 9, for the extract stream, the flow rate of eluent (desorbent) into the chromatographic apparatus(es) used in the first and second separation steps (D) is equal to the rate at which liquid collected via the extract stream in that separation step accumulates in a container (E1 and E2) added to the rate at which extract is recycled back into the chromatographic apparatus used in that particular separation step (D-E1 and D-E2).

In this embodiment, for the raffinate stream from a separation step, the rate at which extract is recycled back into the chromatographic apparatus used in that particular separation step (D-E1 and D-E2) added to the rate at which feedstock is introduced into the chromatographic apparatus used in that particular separation step (F and R1) is equal to the rate at which liquid collected via the raffinate stream in that particular separation step accumulates in a container (R1 and R2) added to the rate at which raffinate is recycled back into the chromatographic apparatus used in that particular separation step (D+F−E1−R1 and D+R1−E2−R2).

In this embodiment, the rate at which liquid collected from a particular extract or raffinate stream from a chromatography apparatus accumulates in a container can also be thought of as the net rate of removal of that extract or raffinate stream from that chromatography apparatus.

Typically in this embodiment, the rate at which liquid collected via the extract and raffinate streams in the first separation step is recycled back into the apparatus used in that separation step is adjusted such that the PUFA product can be separated from different components of the feed mixture in each separation step.

Typically in this embodiment, the rate at which liquid collected via the extract and raffinate streams in the second separation step is recycled back into the apparatus used in that separation step is adjusted such that the PUFA product can be separated from different components of the feed mixture in each separation step.

Preferably in this embodiment, the rate at which liquid collected via the extract and raffinate streams in each separation step is recycled back into the apparatus used in that separation step is adjusted such that the PUFA product can be separated from different components of the feed mixture in each separation step.

Typically in this embodiment, the rate at which liquid collected via the extract stream in the first separation step is recycled back into the chromatography apparatus used in the first separation step differs from the rate at which liquid collected via the extract stream in the second separation step is recycled back into the chromatography apparatus used in the second separation step, and/or the rate at which liquid collected via the raffinate stream in the first separation step is recycled back into the chromatography apparatus used in the first separation step differs from the rate at which liquid collected via the raffinate stream in the second separation step is recycled back into the chromatography apparatus used in the second separation step.

Varying the rate at which liquid collected via the extract and/or raffinate streams in the first or second separation steps is recycled back into the apparatus used in that particular separation step has the effect of varying the amount of more polar and less polar components present in the extract and raffinate streams. Thus, for example, a lower extract recycle rate results in fewer of the less polar components in that separation step being carried through to the raffinate stream. A higher extract recycle rate results in more of the less polar components in that separation step being carried through to the raffinate stream.

Figure 6:
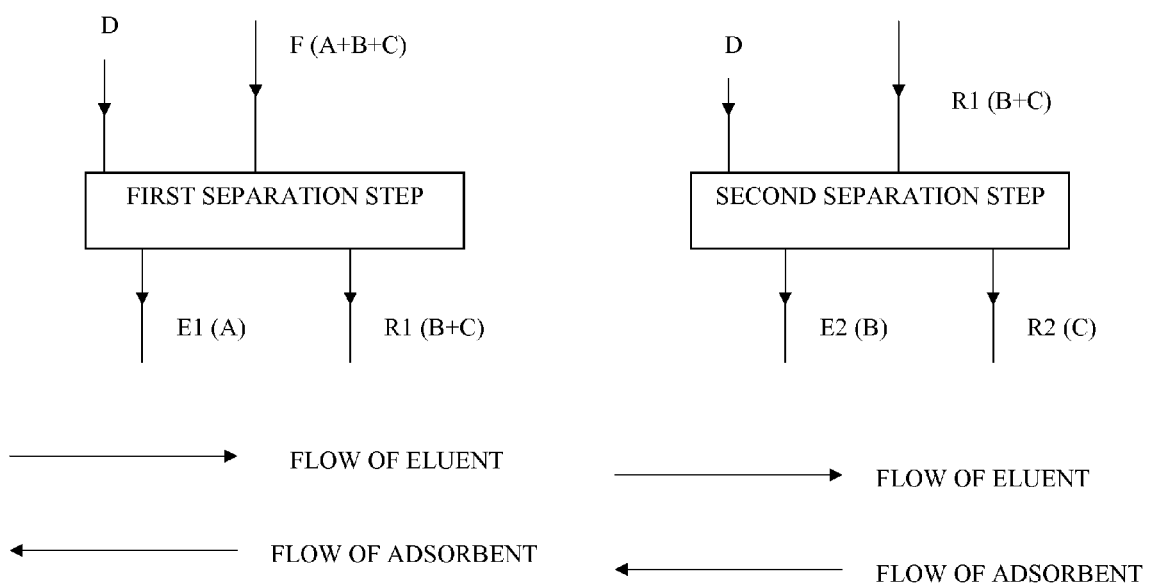
FIG. 6 illustrates in more detail an alternative method for the first preferred embodiment of the invention which is suitable for separating EPA from faster and slower running components (i.e. more polar and less polar impurities).

This can be seen, for example, in the specific embodiment of the invention shown in FIG. 6. The rate at which liquid collected via the extract stream in the first separation step is recycled back into the chromatographic apparatus used in that separation step (D-E1) will affect to what extent any of component A is carried through to the raffinate stream in the first separation step (R1).

Typically in this embodiment, the rate at which liquid collected via the extract stream in the first separation step is recycled back into the chromatographic apparatus used in the first separation step is faster than the rate at which liquid collected via the extract stream in the second separation step is recycled back into the chromatographic apparatus used in the second separation step. Preferably, a raffinate stream containing the PUFA product together with more polar components is collected from the first separation step and purified in a second separation step, and the rate at which liquid collected via the extract stream in the first separation step is recycled back into the chromatographic apparatus used in the first separation step is faster than the rate at which liquid collected via the extract stream in the second separation step is recycled back into the chromatographic apparatus used in the second separation step.

Alternatively in this embodiment, the rate at which liquid collected via the extract stream in the first separation step is recycled back into the chromatographic apparatus used in the first separation step is slower than the rate at which liquid collected via the extract stream in the second separation step is recycled back into the chromatographic apparatus used in the second separation step.

Typically in this embodiment, the rate at which liquid collected via the raffinate stream in the first separation step is recycled back into the chromatographic apparatus used in the first separation step is faster than the rate at which liquid collected via the raffinate stream in the second separation step is recycled back into the chromatographic apparatus used in the second separation step. Preferably, an extract stream containing the PUFA product together with less polar components is collected from the first separation step and purified in a second separation step, and the rate at which liquid collected via the raffinate stream in the first separation step is recycled back into the chromatographic apparatus used in the first separation step is faster than the rate at which liquid collected via the raffinate stream in the second separation step is recycled back into the chromatographic apparatus used in the second separation step.

Alternatively in this embodiment, the rate at which liquid collected via the raffinate stream in the first separation step is recycled back into the chromatographic apparatus used in the first separation step is slower than the rate at which liquid collected via the raffinate stream in the second separation step is recycled back into the chromatographic apparatus used in the second separation step.

In this embodiment, where recycle rates are adjusted such that the PUFA product can be separated from different components of the feed mixture in each separation step, the water:organic solvent ratio of the eluents used in each separation step may be the same or different. Typically, the water:organic solvent ratio of the eluent in each separation step is from 0.5:99.5 to 5.5:94.5 parts by volume.

Typically in this embodiment, the aqueous organic solvent eluent used in each separation step has a different water:organic solvent ratio. The water:organic solvent ratio used in each separation step is preferably adjusted such that the PUFA product can be separated from different components of the feed mixture in each separation step.

In this embodiment, the eluting power of the eluent used in each of the separation steps is typically different. Preferably, the eluting power of the eluent used in the first separation step is greater than that of the eluent used in the second separation step. In practice this is achieved by varying the relative amounts of water and organic solvent used in each separation step.

Depending on the choice of organic solvent, they may be more powerful desorbers than water. Alternatively, they may be less powerful desorbers than water.

Acetonitrile and alcohols, for example, are more powerful desorbers than water. Thus, when the aqueous organic solvent is aqueous alcohol or acetonitrile, the amount of alcohol or acetonitrile in the eluent used in the first separation step is typically greater than the amount of alcohol or acetonitrile in the eluent used in the second separation step.

Typically in this embodiment, the water:organic solvent ratio of the eluent in the first separation step is lower than the water:organic solvent ratio of the eluent in the second separation step. Thus, the eluent in the first separation step typically contains more organic solvent, preferably alcohol, more preferably methanol, than the eluent in the second separation step.

In this embodiment, where the aqueous organic solvent used in each separation step has a different water:organic solvent ratio, the water:organic solvent ratio of the eluent in the first separation step is typically from 0:100 to 5:95 parts by volume, preferably from 0.1:99.9 to 2.5:97.5 parts by volume, more preferably from 0.25:99.75 to 2:98 parts by volume, and most preferably from 0.5:99.5 to 1.5:98.5 parts by volume. In these embodiments, the water:organic solvent ratio of the eluent in the second separation step is typically from 2:98 to 8:92 parts by volume, preferably 3:97 to 7:93 parts by volume, more preferably from 4:96 to 6:94 parts by volume, and even more preferably from 4.5:95.5 to 5.5:94.5 parts by volume.

In this embodiment, where the aqueous organic solvent used in each separation step has a different water organic solvent content, the water:organic solvent ratio of the eluent in the first separation step is preferably from 0.5:99.5 to 1.5:98.5 parts by volume, and the water:organic solvent ratio of the eluent in the second separation step is preferably from 4.5:95:5 to 5.5:94.5 parts by volume.

It will be appreciated that the ratios of water and organic solvent in each separation step referred to above are average ratios within the totality of the chromatographic apparatus.

Typically in this embodiment, the water:organic solvent ratio of the eluent in each separation step is controlled by introducing water and/or organic solvent into one or more columns in the chromatographic apparatuses used in the separation steps. Thus, for example, to achieve a lower water:organic solvent ratio in the first separations step than in the second separation step, water is typically introduced more slowly into the chromatographic apparatus used in the first separation step than in the second separation step.

Typically in this embodiment, essentially pure organic solvent and essentially pure water may be introduced at different points in the chromatographic apparatus used in each separation step. The relative flow rates of these two streams will determine the overall solvent profile in the chromatographic apparatus. Alternatively in this embodiment, different organic solvent/water mixtures may be introduced at different points in each chromatographic apparatus used in each separation step. That will involve introducing two or more different organic solvent/water mixtures into the chromatographic apparatus used in a particular separation step, each organic solvent/water mixture having a different organic solvent:water ratio. The relative flow rates and relative concentrations of the organic solvent/water mixtures in this embodiment will determine the overall solvent profile in the chromatographic apparatus used in that separation step.

Preferably in this embodiment, either (1) the intermediate product containing the PUFA product together with more polar components is collected as the raffinate stream in the first separation step, and the PUFA product is collected as the extract stream in the second separation step; or (2) the intermediate product containing the PUFA product together with less polar components is collected as the extract stream in the first separation step, and the PUFA product is collected as the raffinate stream in the second separation step.

Option (1) is suitable for purifying EPA from a feed mixture.

Figure 2:
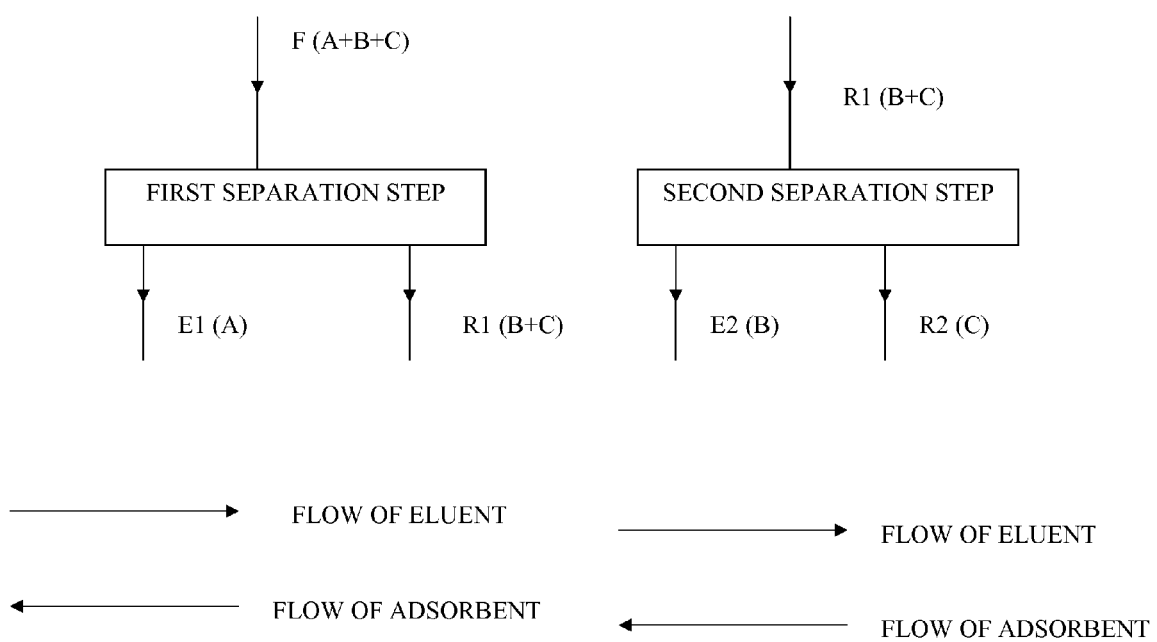
FIG. 2 illustrates one particular embodiment of the invention which is suitable for separating EPA from faster and slower running components (i.e. more polar and less polar impurities).

Option (1) is illustrated in FIG. 2. A feed mixture F comprising the PUFA product (B) and more polar (C) and less polar (A) components is purified in the first separation step. In the first separation step, the less polar components (A) are removed as extract stream E1. The PUFA product (B) and more polar components (C) are collected as raffinate stream R1. Raffinate stream R1 is the intermediate product which is then purified in the second separation step. In the second separation step, the more polar components (C) are removed as raffinate stream R2. The PUFA product (B) is collected as extract stream E2.

Figure 4:
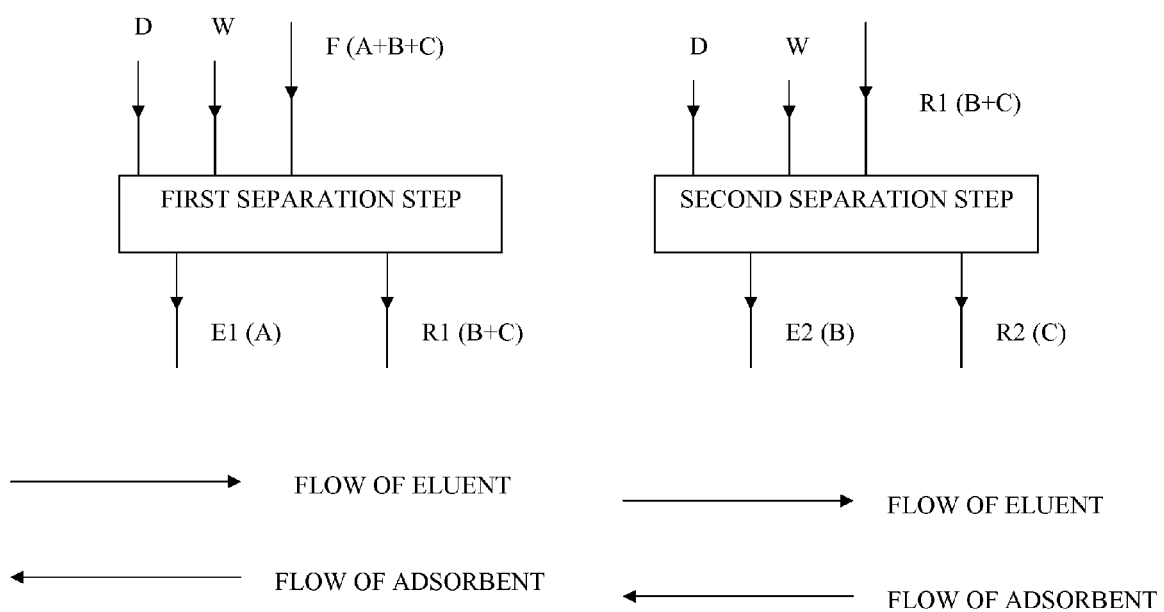
FIG. 4 illustrates in more detail one particular embodiment of the invention which is suitable for separating EPA from faster and slower running components (i.e. more polar and less polar impurities).

Option (1) is illustrated in more detail in FIG. 4. FIG. 4 is identical to FIG. 2, except that the points of introduction of the organic solvent desorbent (D) and water (W) into each chromatographic apparatus are shown. The organic solvent desorbent (D) and water (W) together make up the eluent. The (D) phase is typically essentially pure organic solvent, but may, in certain embodiments be an organic solvent/water mixture comprising mainly organic solvent. The (W) phase is typically essentially pure water, but may, in certain embodiments be an organic solvent/water mixture comprising mainly water, for example a 98% water/2% methanol mixture.

A further illustration of option (1) is shown in FIG. 6. Here there is no separate water injection point, and instead an aqueous organic solvent desorbent is injected at (D).

In this embodiment, the separation into raffinate and extract stream can be aided by varying the desorbing power of the eluent within each chromatographic apparatus. This can be achieved by introducing the organic solvent (or organic solvent rich) component of the eluent and the water (or water rich) component at different points in each chromatographic apparatus. Thus, typically, the organic solvent is introduced upstream of the extract take-off point and the water is introduced between the extract take-off point and the point of introduction of the feed into the chromatographic apparatus, relative to the flow of eluent in the system. This is shown in FIG. 4.

Typically, in this embodiment, the aqueous organic solvent eluent used in the first separation step contains more organic solvent than the eluent used in the second separation step, i.e. the water:organic solvent ratio in the first step is lower than the water:organic solvent ratio in the second step.

In this embodiment, the separation can be aided by varying the rates at which liquid collected via the extract and raffinate streams in the first and second separation steps is recycled back into the chromatographic apparatus used in that separation step.

Typically, in this embodiment, the rate at which liquid collected via the extract stream in the first separation step is recycled back into the chromatographic apparatus used in the first separation step is faster than the rate at which liquid collected via the extract stream in the second separation step is recycled back into the chromatographic apparatus used in the second separation step.

In this embodiment the first raffinate stream in the first separation step is typically removed downstream of the point of introduction of the feed mixture into the chromatographic apparatus used in the first separation step, with respect to the flow of eluent.

In this embodiment, the first extract stream in the first separation step is typically removed upstream of the point of introduction of the feed mixture into the chromatographic apparatus used in the first separation step, with respect to the flow of eluent.

In this embodiment, the second raffinate stream in the second separation step is typically removed downstream of the point of introduction of the intermediate product into the chromatographic apparatus used in the second separation step, with respect to the flow of eluent.

In this embodiment, the second extract stream in the second separation step is typically collected upstream of the point of introduction of the intermediate product into the chromatographic apparatus used in the second separation step, with respect to the flow of eluent.

Typically in this embodiment, the organic solvent or aqueous organic solvent is introduced into the chromatographic apparatus used in the first separation step upstream of the point of removal of the first extract stream, with respect to the flow of eluent.

Typically in this embodiment, when water is introduced into the chromatographic apparatus used in the first separation step, the water is introduced into the chromatographic apparatus used in the first separation step upstream of the point of introduction of the feed mixture but downstream of the point of removal of the first extract stream, with respect to the flow of eluent.

Typically in this embodiment, the organic solvent or aqueous organic solvent is introduced into the chromatographic apparatus used in the second separation step upstream of the point of removal of the second extract stream, with respect to the flow of eluent.

Typically in this embodiment, when water is introduced into the chromatographic apparatus used in the second separation step, the water is introduced into the chromatographic apparatus used in the second separation step upstream of the point of introduction of the intermediate product but downstream of the point of removal of the second extract stream, with respect to the flow of eluent.

Option (2) is suitable for purifying DHA from a feed mixture.

Figure 3:
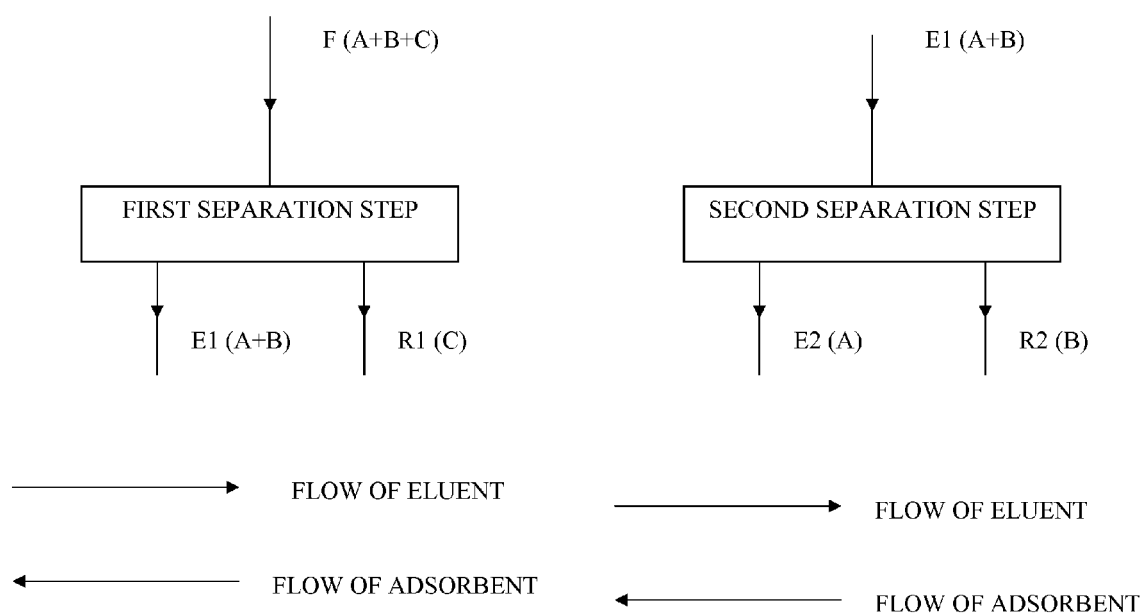
FIG. 3 illustrates one particular embodiment of the invention which is suitable for separating DHA from faster and slower running components (i.e. more polar and less polar impurities).

Option (2) is illustrated in FIG. 3. A feed mixture F comprising the PUFA product (B) and more polar (C) and less polar (A) components is purified in the first separation step. In the first separation step, the more polar components (C) are removed as raffinate stream R1. The PUFA product (B) and less polar components (A) are collected as extract stream E1. Extract stream E1 is the intermediate product which is then purified in the second separation step. In the second separation step, the less polar components (A) are removed as extract stream E2. The PUFA product (B) is collected as raffinate stream R2.

Figure 5:
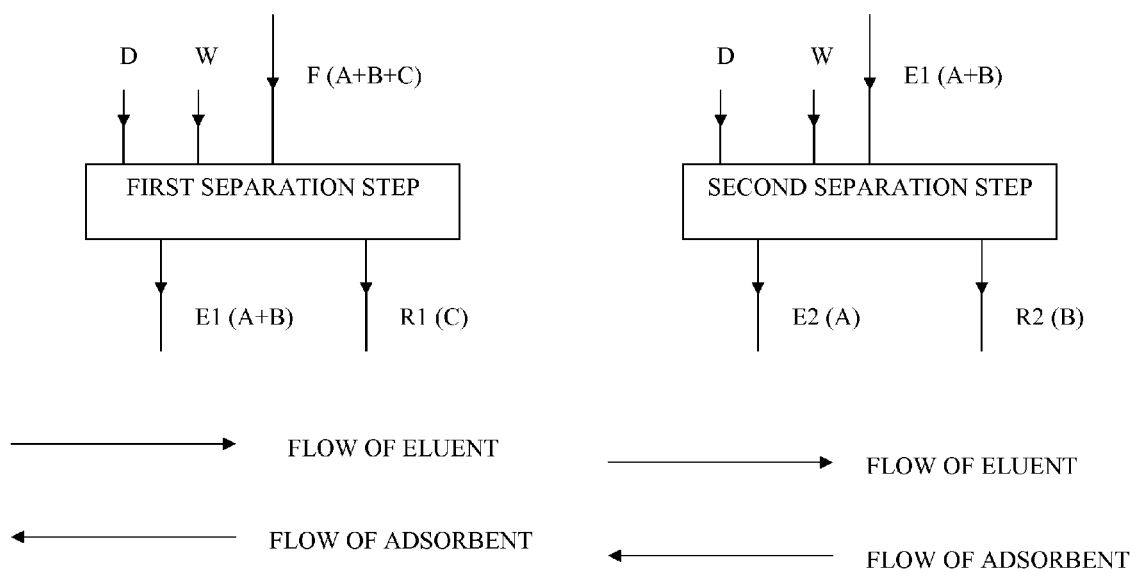
FIG. 5 illustrates in more detail one particular embodiment of the invention which is suitable for separating DHA from faster and slower running components (i.e. more polar and less polar impurities).

Option (2) is illustrated in more detail in FIG. 5. FIG. 5 is identical to FIG. 3, except that the points of introduction of the organic solvent desorbent (D) and water (W) into each chromatographic apparatus are shown. As above, the (D) phase is typically essentially pure organic solvent, but may, in certain embodiments be an organic solvent/water mixture comprising mainly organic solvent. The (W) phase is typically essentially pure water, but may, in certain embodiments be an organic solvent/water mixture comprising mainly water, for example a 98% water/2% methanol mixture.

Figure 7:
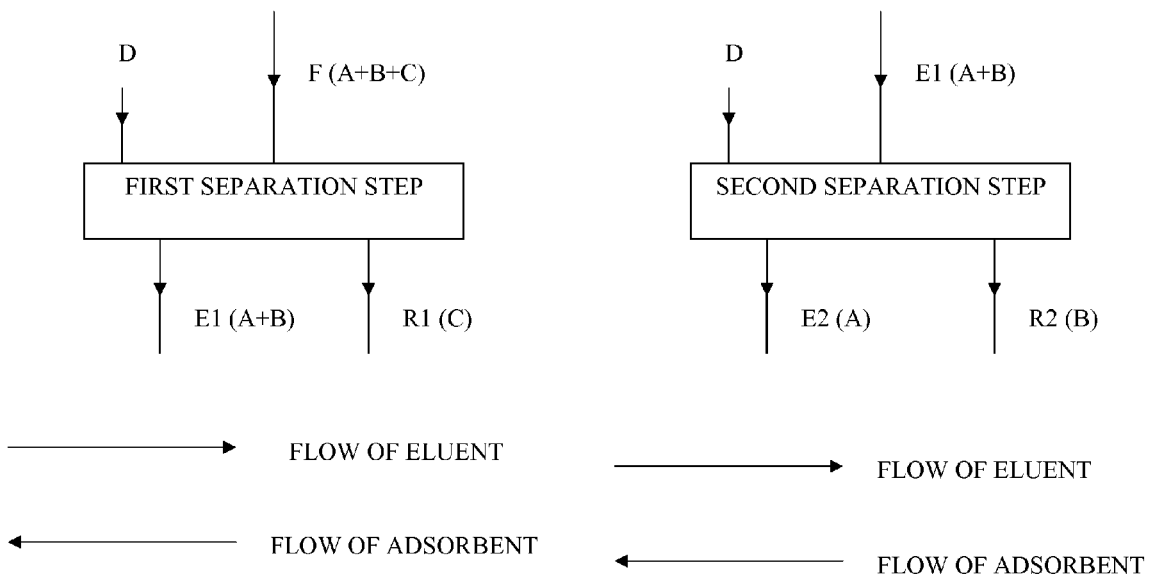
FIG. 7 illustrates in more detail an alternative method for the second preferred embodiment of the invention which is suitable for separating DHA from faster and slower running components (i.e. more polar and less polar impurities).

A further illustration of option (2) is shown in FIG. 7. Here there is no separate water injection point, and instead an aqueous organic solvent desorbent is injected at (D).

Typically in this embodiment, the rate at which liquid collected via the raffinate stream in the first separation step is reintroduced into the chromatographic apparatus used in the first separation step is faster than the rate at which liquid collected via the raffinate stream in the second separation step is reintroduced into the chromatographic apparatus used in the second separation step.

Typically in this embodiment, the aqueous organic solvent eluent used in the first separation step contains less organic solvent than the eluent used in the second separation step, i.e. the water:organic solvent ratio in the first separation step is higher than in the second separation step.

In this embodiment the first raffinate stream in the first separation step is typically removed downstream of the point of introduction of the feed mixture into the chromatographic apparatus used in the first separation step, with respect to the flow of eluent.

In this embodiment, the first extract stream in the first separation step is typically removed upstream of the point of introduction of the feed mixture into the chromatographic apparatus used in the first separation step, with respect to the flow of eluent.

In this embodiment, the second raffinate stream in the second separation step is typically removed downstream of the point of introduction of the intermediate product into the chromatographic apparatus used in the second separation step, with respect to the flow of eluent.

In this embodiment, the second extract stream in the second separation step is typically collected upstream of the point of introduction of the intermediate product into the chromatographic apparatus used in the second separation step, with respect to the flow of eluent.

Typically in this embodiment, the organic solvent or aqueous organic solvent is introduced into the chromatographic apparatus used in the first separation step upstream of the point of removal of the first extract stream, with respect to the flow of eluent.

Typically in this embodiment, when water is introduced into the chromatographic apparatus used in the first separation step, the water is introduced into the chromatographic apparatus used in the first separation step upstream of the point of introduction of the feed mixture but downstream of the point of removal of the first extract stream, with respect to the flow of eluent.

Typically in this embodiment, the organic solvent or aqueous organic solvent is introduced into the chromatographic apparatus used in the second separation step upstream of the point of removal of the second extract stream, with respect to the flow of eluent.

Typically in this embodiment, when water is introduced into the chromatographic apparatus used in the second separation step, the water is introduced into the chromatographic apparatus used in the second separation step upstream of the point of introduction of the intermediate product but downstream of the point of removal of the second extract stream, with respect to the flow of eluent.

In this embodiment, each of the simulated or actual moving bed chromatography apparatus used in the first and second separation steps preferably consist of eight chromatographic columns. These are referred to as columns 1 to 8. In each apparatus the eight columns are arranged in series so that the bottom of column 1 is linked to the top of column 2, the bottom of column 2 is linked to the top of column 3 . . . etc. . . . and the bottom of column 8 is linked to the top of column 1. These linkages may optionally be via a holding container, with a recycle stream into the next column. The flow of eluent through the system is from column 1 to column 2 to column 3 etc. The effective flow of adsorbent through the system is from column 8 to column 7 to column 6 etc.

Figure 8:
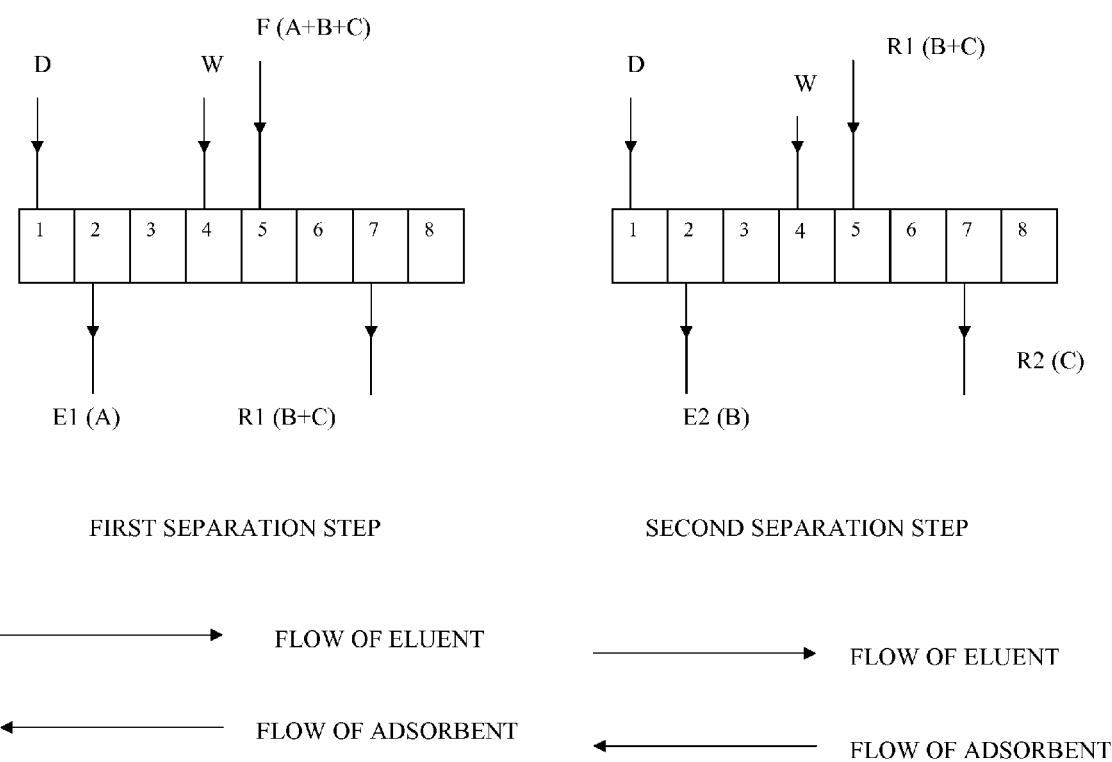
FIG. 8 illustrates one particular embodiment of the invention for purifying EPA from faster and slower running components (i.e. more polar and less polar impurities).

This is illustrated in FIG. 8. A feed mixture F comprising the PUFA product (B) and more polar (C) and less polar (A) components is introduced into the top of column 5 in the chromatographic apparatus used in the first separation step. Organic solvent desorbent is introduced into the top of column 1 of the chromatographic apparatus used in the first separation step. Water is introduced into the top of column 4 of the chromatographic apparatus used in the first separation step. In the first separation step, the less polar components (A) are removed as extract stream E1 from the bottom of column 2. The PUFA product (B) and more polar components (C) are removed as raffinate stream R1 from the bottom of column 7. Raffinate stream R1 is the intermediate product which is then purified in the second separation step, by being introduced into the chromatographic apparatus used in the second separation step at the top of column 5. Organic solvent desorbent is introduced into the top of column 1 in the chromatographic apparatus used in the second separation step. Water is introduced into the top of column 4 in the chromatographic apparatus used in the second separation step. In the second separation step, the more polar components (C) are removed as raffinate stream R2 at the bottom of column 7. The PUFA product (B) is collected as extract stream E2 at the bottom of column 2.

In this embodiment, organic solvent is typically introduced into the top of column 1 of the chromatographic apparatus used in the first separation step.

In this embodiment, water is typically introduced into the top of column 4 of the chromatographic apparatus used in the first separation step.

In this embodiment, organic solvent is typically introduced into the top of column 1 of the chromatographic apparatus used in the second separation step.

In this embodiment, organic solvent is typically introduced into the top of column 4 of the chromatographic apparatus used in the second separation step.

In this embodiment, the feed stream is typically introduced into the top of column 5 of the chromatographic apparatus used in the first separation step.

In this embodiment, a first raffinate stream is typically collected as the intermediate product from the bottom of column 7 of the chromatographic apparatus used in the first separation step. This intermediate product is then purified in the second separation step and is typically introduced into the top of column 5 of the chromatographic apparatus used in the second separation step. The first raffinate stream may optionally be collected in a container before being purified in the second separation step.

In this embodiment, a first extract stream is typically removed from the bottom of column 2 of the chromatographic apparatus used in the first separation step. The first extract stream may optionally be collected in a container and reintroduced into the top of column 3 of the chromatographic apparatus used in the first separation step.

In this embodiment, a second raffinate stream is typically removed from the bottom of column 7 of the chromatographic apparatus used in the second separation step.

In this embodiment, a second extract stream is typically collected from the bottom of column 2 of the chromatographic apparatus used in the second separation step. This second extract stream typically contains the purified PUFA product. The second extract stream may optionally be collected in a container and reintroduced into the top of column 3 of the chromatographic apparatus used in the second separation step.

In this embodiment, the eluent used is typically aqueous alcohol, preferably aqueous methanol. The water:alcohol ratio is typically from 0.5:99.5 to 6:94 parts by volume.

Typically, in this embodiment, the water:organic solvent ratio in the chromatographic apparatus used in the first separation step is lower than the water:organic solvent ratio in the chromatographic apparatus used in the second separation step. Thus, the eluent in the first separation step typically contains more organic solvent than the eluent used in the second separation step.

In this embodiment, the water:organic solvent ratio in the first separation step is typically from 0.5:99.5 to 1.5:98.5 parts by volume. The water:organic solvent ratio in the second separation step is typically from 2:98 to 6:94 parts by volume.

In this embodiment, although the embodiment of FIG. 8 is configured as shown in FIG. 10*a*, the configurations shown in FIGS. 10*b* and 10*c* could also be used in this embodiment.

This embodiment is also illustrated in FIG. 9. A feed mixture F comprising the PUFA product (B) and more polar (C) and less polar (A) components is introduced into the top of column 5 in the chromatographic apparatus used in the first separation step. Aqueous organic solvent desorbent is introduced into the top of column 1 in the chromatographic apparatus used in the first separation step. In the first separation step, the less polar components (A) are removed as extract stream E1 from the bottom of column 2. The PUFA product (B) and more polar components (C) are removed as raffinate stream R1 from the bottom of column 7. Raffinate stream R1 is the intermediate product which is purified in the second separation step by being introduced into the top of column 4 of the chromatographic apparatus used in the second separation step. Aqueous organic solvent desorbent is introduced into the top of column 1 in the chromatographic apparatus used in the second separation step. In the second separation step, the more polar components (C) are removed as raffinate stream R2 at the bottom of column 7. The PUFA product (B) is collected as extract stream E2 at the bottom of column 2.

In this embodiment, aqueous organic solvent is typically introduced into the top of column 1 in the chromatographic apparatus used in the first separation step.

In this embodiment, aqueous organic solvent is typically introduced into the top of column 9 in the chromatographic apparatus used in the second separation step.

In this embodiment, the feed stream is typically introduced into the top of column 5 in the chromatographic apparatus used in the first separation step.

In this embodiment, a first raffinate stream is typically collected as the intermediate product from the bottom of column 7 of the chromatographic apparatus used in the first separation step. This intermediate product is then purified in the second separation step and is typically introduced into the top of column 5 of the chromatographic apparatus used in the second separation step. The first raffinate stream may optionally be collected in a container before being purified in the second separation step.

In this embodiment, a first extract stream is typically removed from the bottom of column 2 of the chromatographic apparatus used in the first separation step. The first extract stream may optionally be collected in a container and a portion reintroduced into the top of column 3 of the chromatographic apparatus used in the first separation step. The rate of recycle of liquid collected via the extract stream in the first separation step back into the chromatographic apparatus used in the first separation step is the rate at which liquid is pumped from this container into the top of column 3.

In this embodiment, a second raffinate stream is typically removed from the bottom of column 7 of the chromatographic apparatus used in the first separation step.

In this embodiment, a second extract stream is typically collected from the bottom of column 2 of the chromatographic apparatus used in the first separation step. This second extract stream typically contains the purified PUFA product. The second extract stream may optionally be collected in a container and a portion reintroduced into the top of column 3 of the chromatographic apparatus used in the first separation step. The rate of recycle of liquid collected via the extract stream from the second separation step back into the chromatographic apparatus used in the second separation step is the rate at which liquid is pumped from this container into the top of column 3.

In this embodiment, the eluent used is typically aqueous alcohol, preferably aqueous methanol. The water:alcohol ratio is typically from 0.5:99.5 to 6:94 parts by volume.

Typically, in this embodiment, the water:organic solvent ratio in the chromatographic apparatus used in the first separation step is lower than the water:organic solvent ratio in the chromatographic apparatus used in the second separation step. Thus, the eluent used in the first separation step typically contains more organic solvent than the eluent used in the second separation step.

In this embodiment, the water:organic solvent ratio in the first separation step is typically from 0.5:99.5 to 1.5:98.5 parts by volume. The water:organic solvent ratio in the second separation step is typically from 2:98 to 6:94 parts by volume.

In this embodiment, the rate at which liquid collected via the extract stream from the first separation step is recycled back into the chromatographic apparatus used in the first separation step is typically faster than the rate at which liquid collected via the extract stream from the second separation step is recycled back into the chromatographic apparatus used in the second separation step. In this case, the aqueous organic solvent eluent is typically substantially the same in each separation step.

In this embodiment, although the embodiment of FIG. 9 is configured as shown in FIG. 10*a*, the configurations shown in FIGS. 10*b* and 10*c* could also be used in this embodiment.

In a further embodiment, the process of the present invention comprises introducing the feed mixture to a simulated or actual moving bed chromatography apparatus having a plurality of linked chromatography columns containing, as eluent, an aqueous alcohol, wherein the apparatus has a plurality of zones comprising at least a first zone and second zone, each zone having an extract stream and a raffinate stream from which liquid can be collected from said plurality of linked chromatography columns, and wherein (a) a raffinate stream containing the PUFA product together with more polar components is collected from a column in the first zone and introduced to a nonadjacent column in the second zone, and/or (b) an extract stream containing the PUFA product together with less polar components is collected from a column in the second zone and introduced to a nonadjacent column in the first zone, said PUFA product being separated from different components of the feed mixture in each zone, wherein the temperature of at least one of the plurality of linked chromatographic columns is greater than 55° C.

In this further embodiment, the term "zone" refers to a plurality of linked chromatography columns containing, as eluent, an aqueous alcohol, and having one or more injection points for a feed mixture stream, one or more injection points for water and/or alcohol, a raffinate take-off stream from which liquid can be collected from said plurality of linked chromatography columns, and an extract take-off stream from which liquid can be collected from said plurality of linked chromatography columns. Typically, each zone has only one injection point for a feed mixture. In one embodiment, each zone has only one injection point for the aqueous alcohol eluent. In another embodiment, each zone has two or more injection points for water and/or alcohol.

In this further embodiment, the temperature of substantially all of the plurality of linked chromatographic columns is typically greater than 55° C. In this further embodiment, the temperature of all of the plurality of linked chromatographic columns is preferably greater than 55° C.

In this further embodiment, the temperature of at least one of the plurality of linked chromatographic columns is typically 56° C. or greater, preferably 57° C. or greater.

Typically in this further embodiment, the temperature of at least one of the plurality of linked chromatographic columns is up to 100° C., preferably up to 95° C., more preferably up to 90° C., even more preferably up to 85° C., even more preferably up to 80° C., even more preferably up to 75° C., and even more preferably up to 70° C.

Typically in this further embodiment, the temperature of at least one of the plurality of linked chromatographic columns is from 56 to 70° C., preferably from 56 to 67° C., more preferably from 56 to 65° C., even more preferably from 57 to 63° C.

This further embodiment relates to processes as described in PCT/GB10/002,339, the entirety of which is incorporated herein by reference. Preferred process conditions specified in PCT/GB10/002,339 are preferred process conditions for this further embodiment, and may be incorporated from PCT/GB10/002,339.

Figure 11:
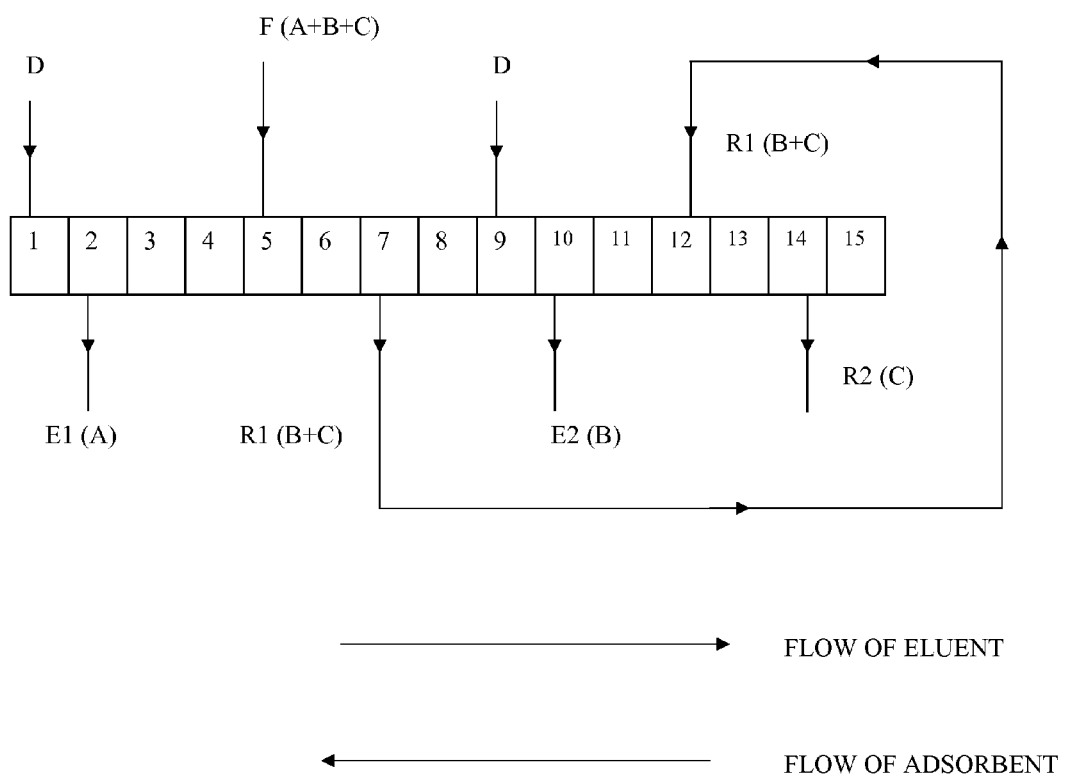
FIG. 11 shows a further embodiment for purifying EPA from faster and slower running components (i.e. more polar and less polar impurities).

This further embodiment is illustrated in FIG. 11. A feed mixture F comprising the PUFA product (B) and more polar (C) and less polar (A) components is introduced into the top of column 5 in the first zone. Aqueous alcohol desorbent is introduced into the top of column 1 in the first zone. In the first zone, the less polar components (A) are removed as extract stream E1 from the bottom of column 2. The PUFA product (B) and more polar components (C) are removed as raffinate stream R1 from the bottom of column 7. Raffinate stream R1 is then introduced into the second zone at the top of column 12. Aqueous alcohol desorbent is introduced into the top of column 9 in the second zone. In the second zone, the more polar components (C) are removed as raffinate stream R2 at the bottom of column 14. The PUFA product (B) is collected as extract stream E2 at the bottom of column 10.

In this further embodiment, aqueous alcohol is typically introduced into the top of column 1 in the first zone.

In this further embodiment, aqueous alcohol is typically introduced into the top of column 9 in the second zone.

In this further embodiment, the feed stream is typically introduced into the top of column 5 in the first zone.

In this further embodiment, a first raffinate stream is typically collected from the bottom of column 7 in the first zone and introduced into the top of column 12 in the second zone. The first raffinate stream may optionally be collected in a container before being introduced into column 12.

In this further embodiment, a first extract stream is typically removed from the bottom of column 2 in the first zone. The first extract stream may optionally be collected in a container and a portion reintroduced into the top of column 3 in the first zone. The rate of recycle of liquid collected via the extract stream from the first zone back into the first zone is the rate at which liquid is pumped from this container into the top of column 3.

In this further embodiment, a second raffinate stream is typically removed from the bottom of column 14 in the second zone.

In this further embodiment, a second extract stream is typically collected from the bottom of column 10 in the second zone. This second extract stream typically contains the purified PUFA product. The second extract stream may optionally be collected in a container and a portion reintroduced into the top of column 11 in the second zone. The rate of recycle of liquid collected via the extract stream from the second zone back into the second zone is the rate at which liquid is pumped from this container into the top of column 11.

In this further embodiment, the rate at which liquid collected via the extract stream from the first zone is recycled back into the first zone is typically faster than the rate at which liquid collected via the extract stream from the second zone is recycled back into the second zone.

In this further embodiment, the aqueous alcohol eluent is typically substantially the same in each zone.

In a still further embodiment, the process of the present invention is other than a chromatographic separation process for recovering a polyunsaturated fatty acid (PUFA) product, from a feed mixture, which process comprises introducing the feed mixture to a simulated or actual moving bed chromatography apparatus having a plurality of linked chromatography columns containing, as eluent, an aqueous alcohol, wherein the apparatus has a plurality of zones comprising at least a first zone and second zone, each zone having an extract stream and a raffinate stream from which liquid can be collected from said plurality of linked chromatography columns, and wherein (a) a raffinate stream containing the PUFA product together with more polar components is collected from a column in the first zone and introduced to a nonadjacent column in the second zone, and/or (b) an extract stream containing the PUFA product together with less polar components is collected from a column in the second zone and introduced to a nonadjacent column in the first zone, said PUFA product being separated from different components of the feed mixture in each zone, wherein the temperature of all of the plurality of linked chromatographic columns is 40° C. or 55° C.

In this still further embodiment, the term "zone" is as defined above.

Typically in this still further embodiment, the temperature of at least one of the plurality of linked chromatographic columns is 40° C. or 55° C. Preferably, in this still further embodiment, the process is conducted at from 15 to 55° C., more preferably at from 20 to 40° C., even more preferably at about 30° C., i.e. typically at room temperature.

Typically in this still further embodiment, the process of the present invention is other than a chromatographic separation process for recovering a polyunsaturated fatty acid (PUFA) product, from a feed mixture, which process comprises introducing the feed mixture to a simulated or actual moving bed chromatography apparatus having a plurality of linked chromatography columns containing, as eluent, an aqueous alcohol, wherein the apparatus has a plurality of zones comprising at least a first zone and second zone, each zone having an extract stream and a raffinate stream from which liquid can be collected from said plurality of linked chromatography columns, and wherein (a) a raffinate stream containing the PUFA product together with more polar components is collected from a column in the first zone and introduced to a nonadjacent column in the second zone, and/or (b) an extract stream containing the PUFA product together with less polar components is collected from a column in the second zone and introduced to a nonadjacent column in the first zone, said PUFA product being separated from different components of the feed mixture in each zone.

Thus, preferably in this still further embodiment, the process of the present invention is other than as described in PCT/GB10/002,339.

In a yet further embodiment, the temperature of at least one of chromatographic columns through which the feed mixture is passed is other than 40° C. or 55° C.

In this yet further embodiment, the temperature of all of the chromatographic columns through which the feed mixture is passed is typically other than 40° C. or 55° C., preferably other than about 40° C. or 55° C., more preferably other than from 39.5 to 40.5° C. or from 54.5 to 55.5° C.

In practice, the process of the present invention will generally be controlled by a computer. The present invention therefore also provides a computer program for controlling a chromatographic apparatus as defined herein, the computer program containing code means that when executed instruct the apparatus to carry out the process of the invention.

The present invention also provides use of one or more heated chromatographic columns and/or heated eluent and/or heated feed mixture in a chromatographic separation process for recovering a polyunsaturated fatty acid (PUFA) product from a feed mixture, which process comprises purifying the feed mixture in one or more chromatographic columns containing, as eluent, an aqueous organic solvent, to (a) reduce the amount of eluent used in the separation process and/or (b) improve the resolution in the separation process of the various components present in the feed mixture.

Typically at least one of the chromatographic columns and/or heated eluent and/or heated feed mixture are heated to a temperature as defined herein.

Typically, the present invention also provides use of heated eluent in a chromatographic separation process for recovering a polyunsaturated fatty acid (PUFA) product from a feed mixture, which process comprises purifying the feed mixture in one or more chromatographic columns containing, as eluent, an aqueous organic solvent, to (a) reduce the amount of eluent used in the separation process and/or (b) improve the resolution in the separation process of the various components present in the feed mixture.

The present invention also provides a chromatographic separation process for recovering a polyunsaturated fatty acid (PUFA) product from a feed mixture, which process comprises passing the feed mixture through one or more heated chromatographic columns containing, as eluent, an aqueous organic solvent, wherein the temperature of at least one of the chromatographic columns through which the feed mixture is passed is greater than room temperature, and/or wherein the temperature of the eluent and/or feed mixture is greater than room temperature, and wherein the one or more heated chromatographic columns enables (a) reduction of the amount of eluent used in the separation process and/or (b) improvement in the resolution in the separation process of the various components present in the feed mixture.

Typically, at least one of the chromatographic columns are heated to a temperature as defined herein.

Preferably, the eluent is heated to a temperature as defined herein.

Typically, this process is a process as described herein.

Typically, in the process of the present invention, the at least one chromatographic column at a temperature greater than room temperature enables (a) reduction of the amount of eluent used in the separation process and/or (b) improvement in the resolution in the separation process of the various components present in the feed mixture.

The present invention also provides compositions comprising a PUFA product obtainable by the process of the present invention.

The following Examples illustrate the invention.

EXAMPLES

Example 1

A fish oil derived feedstock (55 weight % EPA EE, 5 weight % DHA EE) is fractionated using an actual moving bed chromatography system using bonded C18 silica gel (particle size 300 μm) as stationary phase and aqueous methanol (90:10 w/w methanol:water) as eluent according to the system schematically illustrated in FIG. 11. 15 columns (diameter: 22 mm, length: 300 mm) are connected in series as shown in FIG. 11. The desorbent was preheated to a temperature of 60° C., resulting in a column temperature of approximately 60° C.

Figure 12:
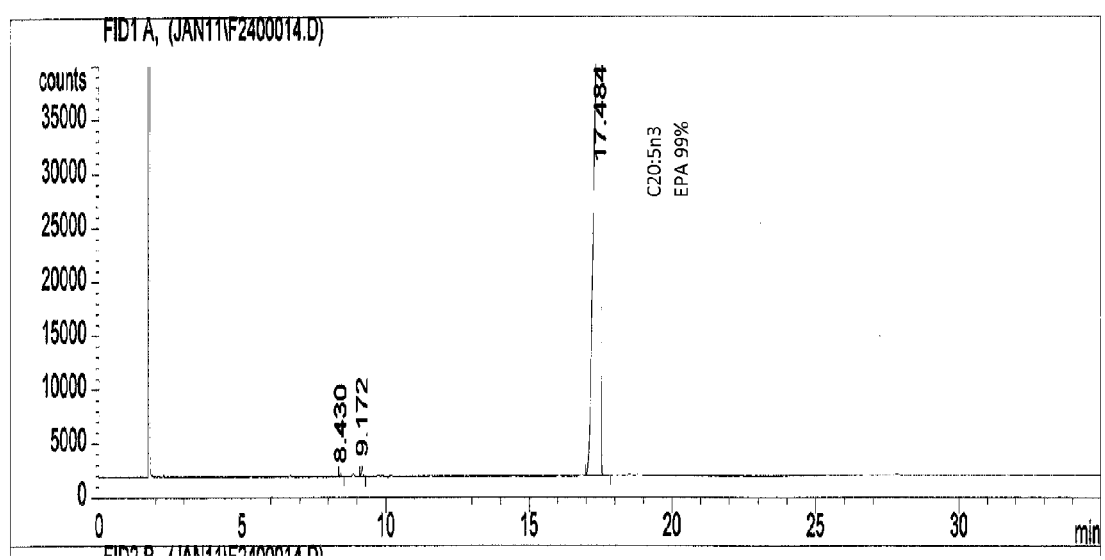
FIG. 12 shows a GC FAMES trace of an EPA PUFA product produced in accordance with the present invention.

The operating parameters and flowrates are as follows. For the conditions below, EPA EE is produced at a high level of purity (99% by GC FAMES). A GC FAMES trace of the EPA product is shown as FIG. 12.

Step time: 600 secs
Feedstock (F) feed rate: 0.5 ml/min
Desorbent feed rate (D1) in first zone: 33 ml/min
Extract rate (E1) in first zone: 7 ml/min
Extract recycle rate (D1-E1) in first zone: 26 ml/min
Raffinate rate (R1) in first zone: 8 ml/min
Desorbent feed rate (D2) in second zone: 34 ml/min Extract rate (E2) in second zone: 10 ml/min
Extract recycle rate (D2-E2) in second zone: 24 ml/min
Raffinate rate (R2) in second zone: 8 ml/min Example 2

Figure 10:
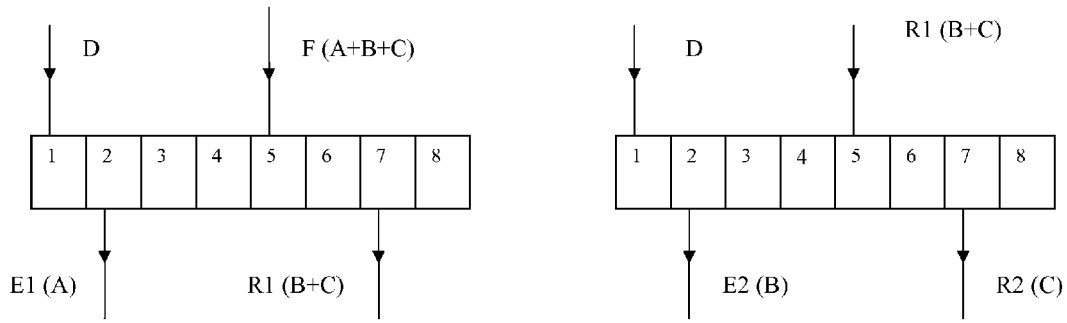
FIG. 10 illustrates three ways in which one particular embodiment of the chromatographic separation process of the invention may be carried out.
Figure 10:
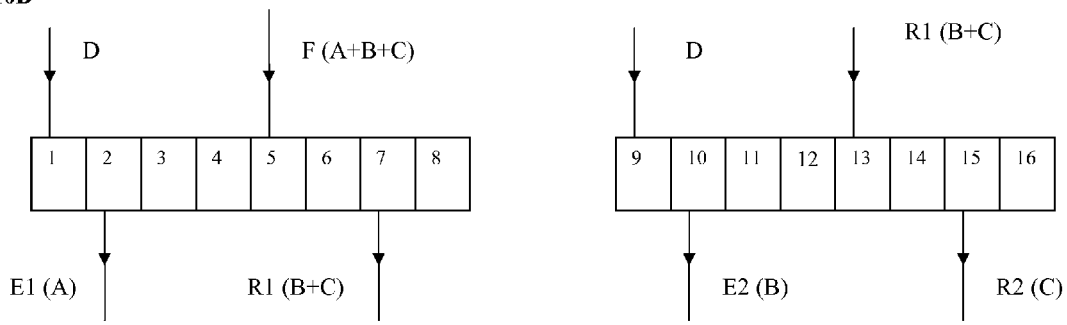
Figure 10:
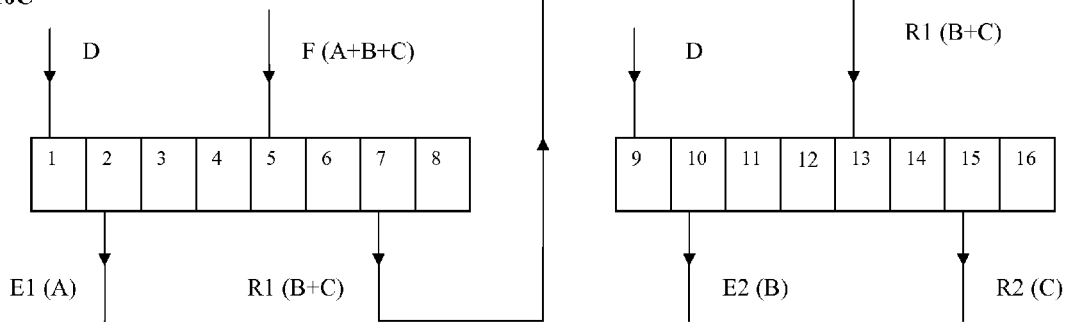

A fish oil derived feedstock (55 weight % EPA EE, 5 weight % DHA EE) is fractionated using an actual moving bed chromatography system using bonded C18 silica gel (particle size 300 μm) as stationary phase and aqueous methanol (98:2 w/w methanol:water) as eluent according to the system schematically illustrated in FIG. 10. Separation 1 consists of 8 columns (diameter: 76.29 mm, length: 914.40 mm) which are connected in series as shown in FIG. 10. The intermediate raffinate from separation 1 is isolated and separated and separation 2 is performed using the same sequence of columns as above. The desorbent was preheated to a temperature of 40° C., resulting in a column temperature of approximately 40° C.

Figure 13:
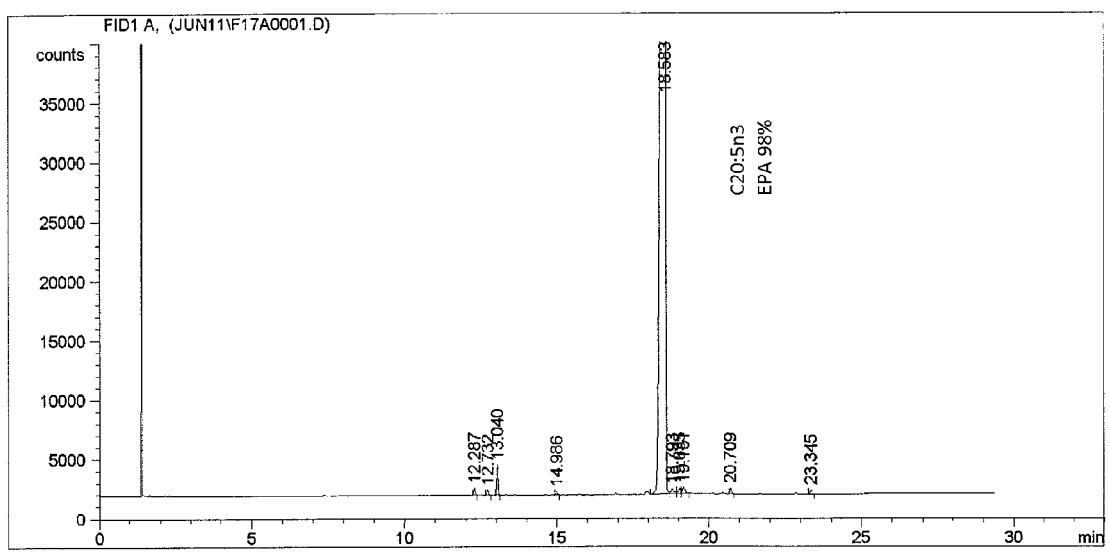
FIG. 13 shows a GC FAMES trace of an EPA PUFA product produced in accordance with the present invention.

The operating parameters and flowrates are as follows. For the conditions below, EPA EE is produced at a high level of purity (98% by GC FAMES). A GC FAMES trace of the EPA product is shown as FIG. 13.

Step time: 1200 secs
Feedstock (F) feed rate: 35 ml/min
Desorbent feed rate (D1) in first step: 2270 ml/min
Extract rate (E1) in first step: 1320 ml/min
Extract recycle rate (D1-E1) in first step: 950 ml/min
Raffinate rate (R1) in first step: 950 ml/min
Desorbent feed rate (D2) in second step: 1510 ml/min
Extract rate (E2) in second step: 850 ml/min
Extract recycle rate (D2-E2) in second step: 660 ml/min
Raffinate rate (R2) in second step: 670 ml/min Example 3

The retention times of a number of common fatty acids were measured in a fixed bed chromatographic apparatus using an aqueous methanol and a C18 silica adsorbent. Thus, the retention times of Stearidonic acid (SDA), Eicosapentaenoic acid (EPA), Docosahexaenoic acid (DHA) and Oleic acid (OA) were measured, and the temperature and concentration of methanol was varied. The tables below show the absolute retention times, and relative retention times (relative to EPA) for the various fatty acids.

From the absolute retention times in tables 1, 3 and 5, it can be seen that the overall run time is much shorter at increased temperature, i.e. lower solvent consumption and higher throughput at higher temperature.

From the relative retention times in tables 2, 4 and 6, it can be seen that increased temperature has a greater effect on the relative retention time of the less polar impurities (OA) than more closely related components (DHA). Thus at 5% water, the relative retention time of OA (wrt EPA) is reduced from 1.91 at 18° C. to 1.63 at 70° C., whereas the relative retention time of DHA (wrt EPA) is reduced from 1.19 at 18° C. to 1.15 at 70° C. A similar effect is seen when tests are performed using 2% water and 10% water respectively.

This means that improved resolution of closely related components (e.g. EPA from DHA) can be achieved using increased water content, but at lower solvent consumption and higher throughput when carried out at higher temperature.

TABLE 1

Retention time (minutes) of main fatty acid peaks at various temperatures using methanol containing 2% water as mobile phase and C18 silica

| Regular C18 | Rt @18 C. | Rt @30 C. | Rt@ 40 C. | Rt@ 50 C. | Rt @60 C. | Rt 70 C. |
|---|---|---|---|---|---|---|
| SDA (C18:4n3) | 6.7 | 6.1 | 5.9 | 5.7 | 5.4 | 4.96 |
| EPA (C20:5n3) | 7.4 | 6.66 | 6.38 | 6.06 | 5.7 | 5.15 |
| DHA (C22:6n3) | 8.3 | 7.54 | 7.24 | 6.8 | 6.4 | 5.78 |
| OA (C18:1) | 12.3 | 10.6 | 10.01 | 9.2 | 8.4 | 7.35 |

TABLE 2

Relative Retention times (RRT) of main fatty acid peaks wrt EPA at various temperatures using methanol containing 2% water as mobile phase and C18 silica

| Regular C18 | RRT @18 C. | RRT @30 C. | RRT@ 40 C. | RRT@ 50 C. | RRt @60 C. | RRt 70 C. |
|---|---|---|---|---|---|---|
| SDA (C18:4n3) | 0.91 | 0.92 | 0.92 | 0.94 | 0.95 | 0.96 |
| EPA (C20:5n3) | 1.0 | 1.0 | 1.0 | 1.0 | 1.0 | 1.0 |
| DHA (C22:6n3) | 1.12 | 1.13 | 1.13 | 1.12 | 1.12 | 1.12 |
| OA (C18:1) | 1.66 | 1.59 | 1.57 | 1.52 | 1.47 | 1.43 |

TABLE 3

Retention time (minutes) of main fatty acid peaks at various temperatures using methanol containing 5% water as mobile phase and C18 silica

| Regular C18 | Rt @18 C. | Rt @30 C. | Rt@ 40 C. | Rt@ 50 C. | Rt @60 C. | Rt 70 C. |
|---|---|---|---|---|---|---|
| SDA (C18:4n3) | 10.3 | 9.57 | 9.14 | 8.75 | 8.3 | 8 |
| EPA (C20:5n3) | 12.08 | 11.17 | 10.6 | 10.1 | 9.59 | 9.14 |
| DHA (C22:6n3) | 14.33 | 13.15 | 12.4 | 11.73 | 11.08 | 10.49 |
| OA (C18:1) | 23.07 | 20.47 | 18.79 | 17.46 | 16.11 | 14.9 |

TABLE 4

Relative Retention times (RRT) of main fatty acid peaks wrt EPA at various temperatures using methanol containing 5% water as mobile phase and C18 silica

| Regular C18 | RRT @18 C. | RRT @30 C. | RRT@ 40 C. | RRT@ 50 C. | RRt @60 C. | RRt 70 C. |
|---|---|---|---|---|---|---|
| SDA (C18:4n3) | 0.85 | 0.86 | 0.86 | 0.87 | 0.87 | 0.88 |
| EPA (C20:5n3) | 1.0 | 1.0 | 1.0 | 1.0 | 1.0 | 1.0 |
| DHA (C22:6n3) | 1.19 | 1.18 | 1.17 | 1.16 | 1.16 | 1.15 |
| OA (C18:1) | 1.91 | 1.83 | 1.77 | 1.73 | 1.68 | 1.63 |

TABLE 5

Retention time (minutes) of main fatty acid peaks at various temperatures using methanol containing 10% water as mobile phase and C18 silica

| Regular C18 | Rt @18 C. | Rt @30 C. | Rt@ 40 C. | Rt@ 50 C. | Rt @60 C. | Rt 70 C. |
|---|---|---|---|---|---|---|
| SDA (C18:4n3) | 20.69 | n/a | n/a | 17.27 | 16.33 | 16.41 |
| EPA (C20:5n3) | 26.45 | n/a | n/a | 21.78 | 20.38 | 20.41 |
| DHA (C22:6n3) | 34.43 | n/a | n/a | 27.61 | 25.88 | 25.77 |
| OA (C18:1) | 58.81 | n/a | n/a | 43.97 | 40.55 | 40.61 |

TABLE 6

Relative Retention times (RRT) of main fatty acid peaks wrt EPA at various temperatures using methanol containing 10% water as mobile phase and C18 silica

| Regular C18 | RRT @18 C. | RRT @30 C. | RRT@ 40 C. | RRT@ 50 C. | RRt @60 C. | RRt 70 C. |
|---|---|---|---|---|---|---|
| SDA (C18:4n3) | 0.78 | n/a | n/a | 0.79 | 0.80 | 0.80 |
| EPA (C20:5n3) | 1.0 | n/a | n/a | 1.0 | 1.0 | 1.0 |
| DHA (C22:6n3) | 1.30 | n/a | n/a | 1.27 | 1.27 | 1.26 |
| OA (C18:1) | 2.22 | n/a | n/a | 2.02 | 1.99 | 1.99 |

The invention claimed is:

1. A chromatographic separation process for recovering a polyunsaturated fatty acid (PUFA) product from a feed mixture, which process comprises passing the feed mixture through one or more chromatographic columns containing, as eluent, an aqueous organic solvent, wherein a temperature of at least one of the chromatographic columns through which the feed mixture is passed is greater than room temperature and the PUFA product is collected from the separation process, wherein the one or more chromatographic columns contain, as absorbent, polymeric beads or a silica gel, and the feed mixture is a fish oil feedstock or a feedstock derived from fish oil, and the collected PUFA product is EPA or EPA ethyl ester produced in a purity greater than 90% purity.

2. The process according to claim 1, wherein the eluent is not in a supercritical state.

3. The process according to claim 1 or 2, wherein the temperature of at least one of the chromatographic columns greater than room temperature is achieved by heating the aqueous organic solvent eluent and/or feed mixture to a temperature greater than room temperature.

4. The process according to claim 1, wherein the temperature of at least one of the chromatographic columns is greater than 30° C.

5. The process according to claim 1, wherein the temperature of at least one of the chromatographic columns is up to 100° C.

6. The process according to claim 1, wherein the temperature of at least one of the chromatographic columns is from 40 to 70° C.

7. The process according to claim 1, wherein the PUFA product comprises at least one ω-3 PUFA.

8. The process according to claim 7, wherein the PUFA product comprises EPA or an EPA derivative and/or DHA or a DHA derivative.

9. The process according to claim 7, wherein the PUFA product comprises EPA or EPA ethyl ester (EE).

10. The process according to claim 1, which process comprises introducing the feed mixture into one or more simulated or actual moving bed chromatography apparatuses having a plurality of linked chromatography columns containing, as eluent, an aqueous organic solvent, wherein a temperature of at least one of the plurality of linked chromatographic columns is greater than room temperature.

11. The process according to claim 10, which process comprises the steps of:

(a) purifying the feed mixture in a first separation step in a simulated or actual moving bed chromatography apparatus having a plurality of linked chromatography columns containing, as eluent, an aqueous organic solvent, to obtain an intermediate product; and (b) purifying the intermediate product obtained in (a) in a second separation step using a simulated or actual moving bed chromatography apparatus having a plurality of linked chromatography columns containing, as eluent, an aqueous organic solvent, to obtain the PUFA product;

wherein a temperature of one or more of the plurality of linked chromatography columns in the first separation step and/or one or more of the plurality of linked chromatography columns in the second separation step is greater than room temperature; and wherein (a) the first and second separation steps are carried out sequentially on the same chromatography apparatus, the intermediate product being recovered between the first and second separation steps and the process conditions in the chromatography apparatus being adjusted between the first and second separation steps such that the PUFA product is separated from different components of the feed mixture in each separation step; or (b) the first and second separation steps are carried out on separate first and second chromatography apparatuses respectively, the intermediate product obtained from the first separation step being introduced into the second chromatography apparatus, and the PUFA product being separated from different components of the feed mixture in each separation step.

12. The process according to claim 10, wherein the temperature of all of the chromatographic columns is greater than room temperature.

13. The process according to claim any one of claim 10, wherein each apparatus has an extract stream and a raffinate stream from which liquid can be collected from said plurality of linked chromatography columns.

14. The process according to claim 1, wherein the eluent contains more than 5 wt % water, based on the total weight of the organic solvent and water.

15. The process according to claim 1, wherein the eluent is a mixture of water and an alcohol, an ether, an ester, a ketone or a nitrile.

16. The process according to claim 15, wherein the eluent is a mixture of water and methanol.

17. The chromatographic separation process according to claim 1, wherein when the process comprises introducing the feed mixture to a simulated or actual moving bed chromatography apparatus having a plurality of linked chromatography columns containing, as eluent, an aqueous alcohol, wherein the apparatus has a plurality of zones comprising at least a first zone and second zone, each zone having an extract stream and a raffinate stream from which liquid can be collected from said plurality of linked chromatography columns, and wherein (a) a raffinate stream containing the PUFA product together with more polar components is collected from a column in the first zone and introduced to a nonadjacent column in the second zone, and/or (b) an extract stream containing the PUFA product together with less polar components is collected from a column in the second zone and introduced to a nonadjacent column in the first zone, said PUFA product being separated from different components of the feed mixture in each zone, wherein a temperature of at least one of the plurality of linked chromatographic columns is greater than 55° C., preferably 56° C. or greater.

18. The process according to claim 1, wherein the at least one chromatographic column at a temperature greater than room temperature enables (a) reduction of the amount of eluent used in the separation process and/or (b) improvement in the resolution in the separation process of the various components present in the feed mixture.

19. A chromatographic separation process for recovering a polyunsaturated fatty acid (PUFA) product from a feed mixture, the separation process comprising purifying the feed mixture in one or more chromatographic columns containing, as eluent, an aqueous organic solvent, wherein one or more of the chromatographic columns are heated, and/or the eluent is heated, and/or the feed mixture is heated, thereby reducing the amount of eluent used in the separation process and/or improving the resolution of various components present in the feed mixture in the separation process, and wherein the PUFA product is collected from the separation process in a purity greater than 90% purity.

20. The process according to claim 19, wherein the one or more heated columns and/or the heated eluent and/or the heated feed mixture is heated to a temperature greater than 30° C.

* * * * *